(12) United States Patent
Bourdel et al.

(10) Patent No.: US 9,054,789 B2
(45) Date of Patent: Jun. 9, 2015

(54) METHOD AND DEVICE FOR GENERATING ULTRA WIDE BAND PULSES

(75) Inventors: Sylvain Bourdel, Ensues la Redonne (FR); Rémi Vauche, Marseilles (FR)

(73) Assignee: Universite d'Aix-Marseille, Marseille (FR)

( * ) Notice: Subject to any disclaimer, the term of this patent is extended or adjusted under 35 U.S.C. 154(b) by 1224 days.

(21) Appl. No.: 12/875,033

(22) Filed: Sep. 2, 2010

(65) Prior Publication Data
US 2012/0027050 A1 Feb. 2, 2012

(30) Foreign Application Priority Data
Jul. 27, 2010 (FR) ...................................... 10 03137

(51) Int. Cl.
H04B 1/717 (2011.01)
H04B 1/7163 (2011.01)

(52) U.S. Cl.
CPC .......... H04B 1/7174 (2013.01); H04B 1/71632 (2013.01)

(58) Field of Classification Search
CPC ............... H04B 1/7163; H04B 1/7172; H04B 1/71635; H04B 1/71632; H04B 1/7174; H04B 1/02; H04B 2001/02; H04B 2001/0408
USPC ............. 375/377, 295, 256, 297; 327/84, 92, 327/100, 291, 494, 495, 588
See application file for complete search history.

(56) References Cited

U.S. PATENT DOCUMENTS

| | | | | |
|---|---|---|---|---|
| 6,658,053 B1 * | 12/2003 | Aiello et al. | .................. | 375/224 |
| 8,169,272 B2 * | 5/2012 | Chen et al. | .................... | 332/108 |
| 8,204,097 B2 * | 6/2012 | Oh et al. | ........................ | 375/138 |
| 8,204,146 B2 * | 6/2012 | Mimura et al. | ............... | 375/295 |
| 2003/0227980 A1 * | 12/2003 | Batra et al. | .................... | 375/295 |
| 2004/0157550 A1 * | 8/2004 | Nakagawa | ........................ | 455/7 |
| 2004/0190666 A1 * | 9/2004 | Aiello et al. | .................. | 375/354 |
| 2005/0141605 A1 * | 6/2005 | Akahori et al. | ............... | 375/239 |
| 2005/0179585 A1 * | 8/2005 | Walker et al. | ................. | 342/134 |
| 2006/0234761 A1 * | 10/2006 | Nagasaka | .................. | 455/552.1 |
| 2008/0205488 A1 * | 8/2008 | Reefman et al. | .............. | 375/140 |
| 2009/0135974 A1 * | 5/2009 | Mimura et al. | ............... | 375/354 |
| 2010/0046581 A1 * | 2/2010 | Oh et al. | ........................ | 375/130 |
| 2011/0260551 A1 * | 10/2011 | Law et al. | ..................... | 307/106 |

OTHER PUBLICATIONS

Bourdel, S. et al., "Low-cost CMOS pulse generator for UWB systems," Electronics Letters 43(25):1425-1427, Dec. 6, 2007.
Choi, Y. H., "Gated UWB Pulse Signal Generation," Joint UWBST & IWUWBS Conference on Ultrawideband Systems and Technologies, pp. 122-124, May 18-21, 2004.

(Continued)

Primary Examiner — Jean B Corrielus
(74) Attorney, Agent, or Firm — Seed IP Law Group PLLC

(57) ABSTRACT

The disclosure relates to a method for generating UWB waveforms, each comprising a sequence of pulses, the method comprising: generating consecutive elementary pulses having durations corresponding to setpoint durations and a constant amplitude, amplifying each elementary pulse separately as a function of a respective setpoint amplitude, and combining the amplified elementary pulses to obtain a waveform successively comprising each of the amplified alternately positive and negative, elementary pulses.

19 Claims, 11 Drawing Sheets

(56) References Cited

OTHER PUBLICATIONS

Kim, H. et al., "All-digital low-power CMOS pulse generator for UWB system," Electronics Letters 40(24):1534-1535, Nov. 25, 2004.

Vauche, R. et al., "Fully Tunable UWB Pulse Generator with Zero DC Power Consumption," IEEE International Conference on Ultra-Wideband, pp. 418-422, Sep. 9-11, 2009.

Bachelet, Y. et al., "Fully integrated CMOS UWB pulse generator," Electronics Letters 42(22):1277-1278, Oct. 26, 2006.

Bourdel, S. et al., "A 9-pJ/Pulse 1.42-Vpp OOK CMOS UWB Pulse Generator for the 3.1-10.6-GHz FCC Band," IEEE Transactions on Microwave Theory and Techniques 58(1):65-73, Jan. 2010.

Han, J. et al., "Ultra-Wideband Electronically Tunable Pulse Generators," IEEE Microwave and Wireless Components Letters 14(3):112-114, Mar. 2004.

Phan et al., "A 18-pJ/Pulse OOK CMOS Transmitter for Multiband UWB Impulse Radio," IEEE Microwave and Wireless Components Letters 17(9):688-690, Sep. 2007.

Phan et al., "Energy-Efficient Low-Complexity CMOS Pulse Generator for Multiband UWB Impulse Radio," IEEE Transactions on Circuits and Systems-I: Regular Papers 55(11):3552-3563, Dec. 2008.

Sim, S. et al., "A CMOS UWB Pulse Generator for 6-10 GHz Applications," IEEE Microwave and Wireless Components Letters 19(2):8385, Feb. 2009.

Wentzloff, D. et al., "A 47pJ/pulse 3.1-to-5GHz All-Digital UWB Transmitter in 90nm CMOS," IEEE International Solid-State Circuits Conference, ISSCC Session 6 (6.4), UWB and mm-WAVE Communications Systems, 2007.

* cited by examiner

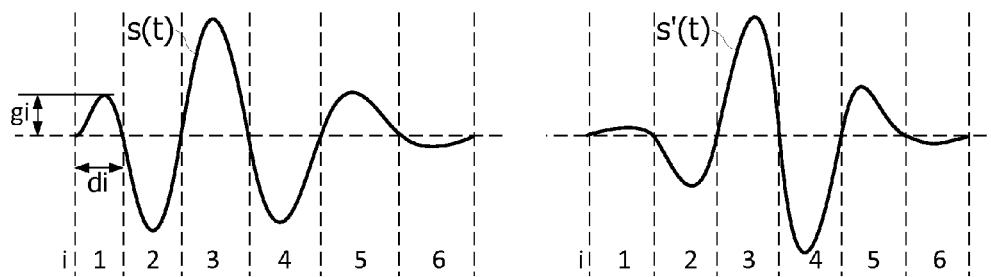
FIG. 1A   FIG. 1B
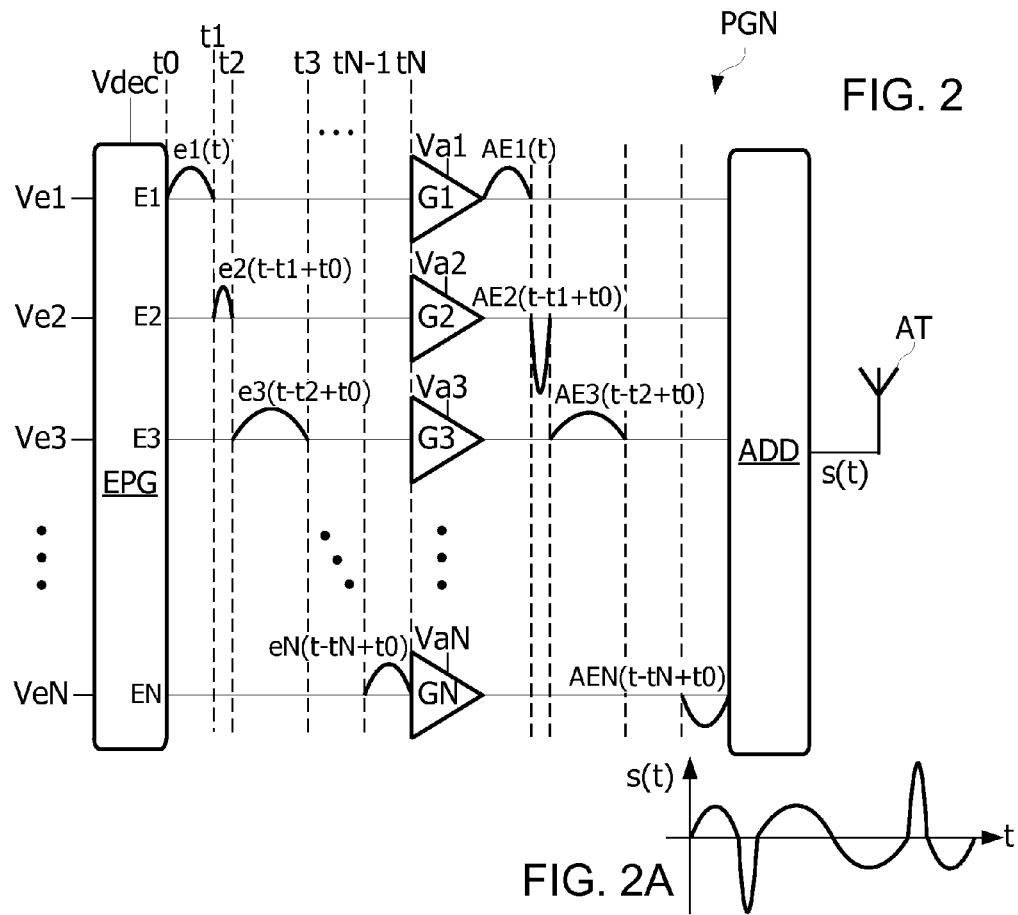
FIG. 2
FIG. 2A

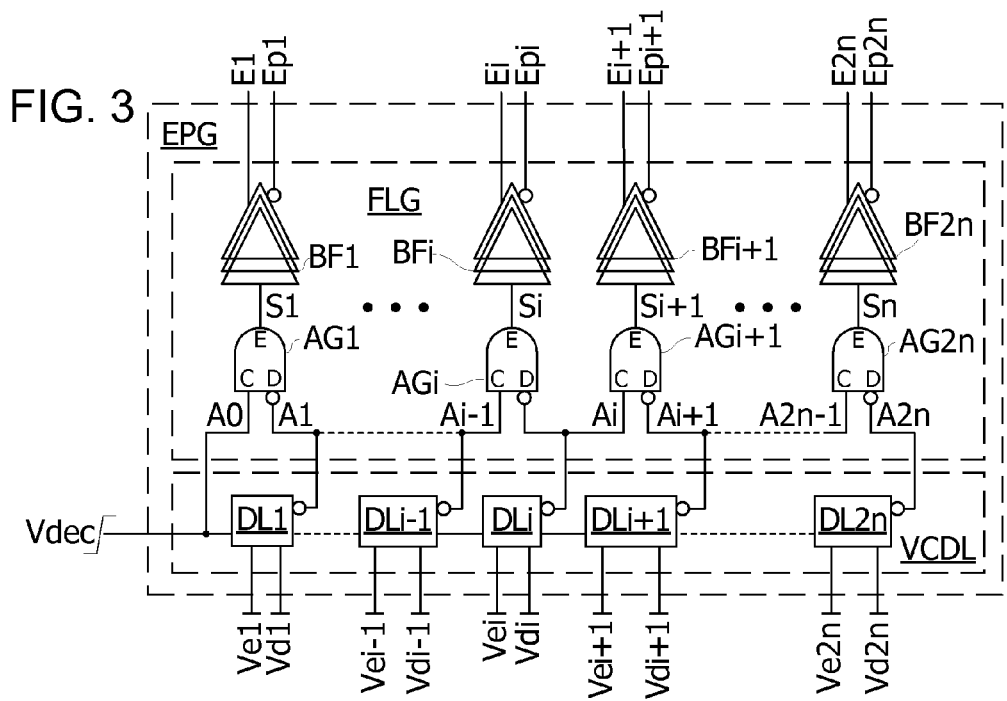
FIG. 3
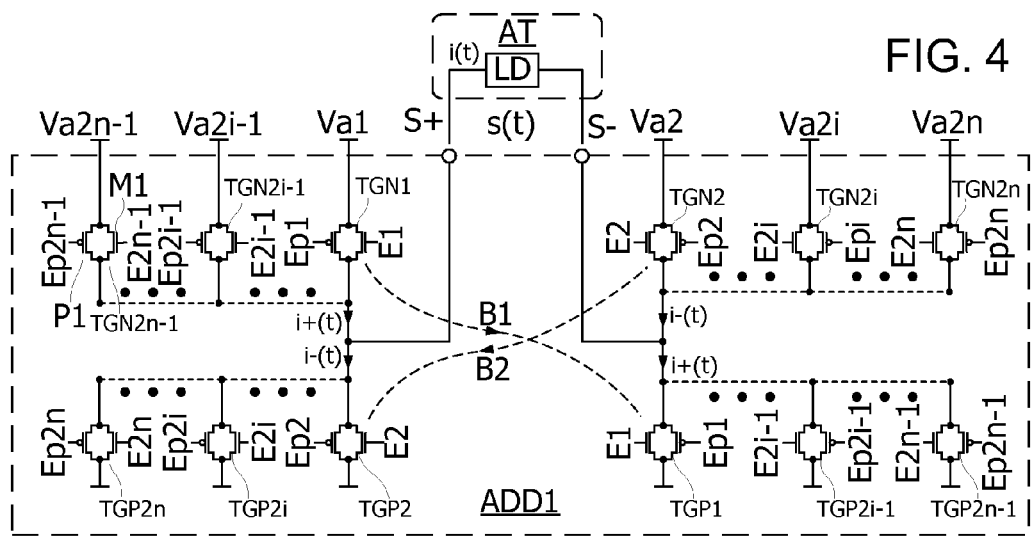
FIG. 4
| MA1 | ⋯ | MAi | ⋯ | MA2n | VN1 | ⋯ | VNi | ⋯ | VN2n | D1 | ⋯ | Di | ⋯ | D2n |
FIG. 5

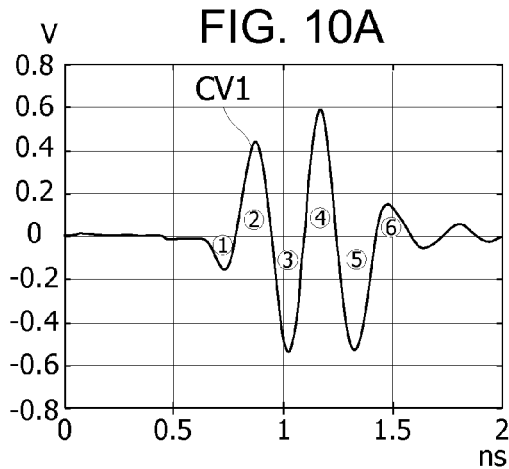
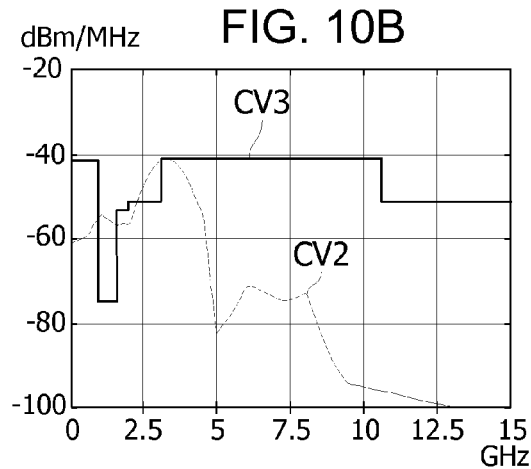
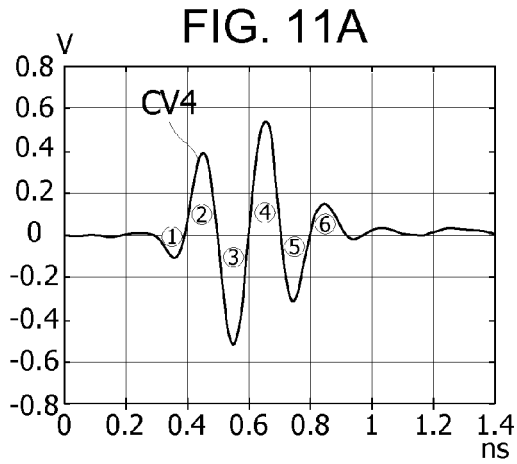
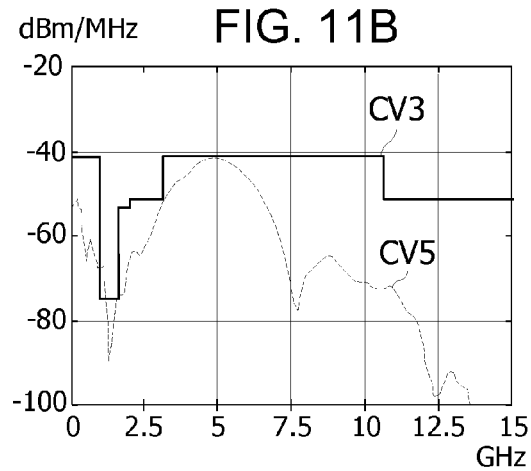
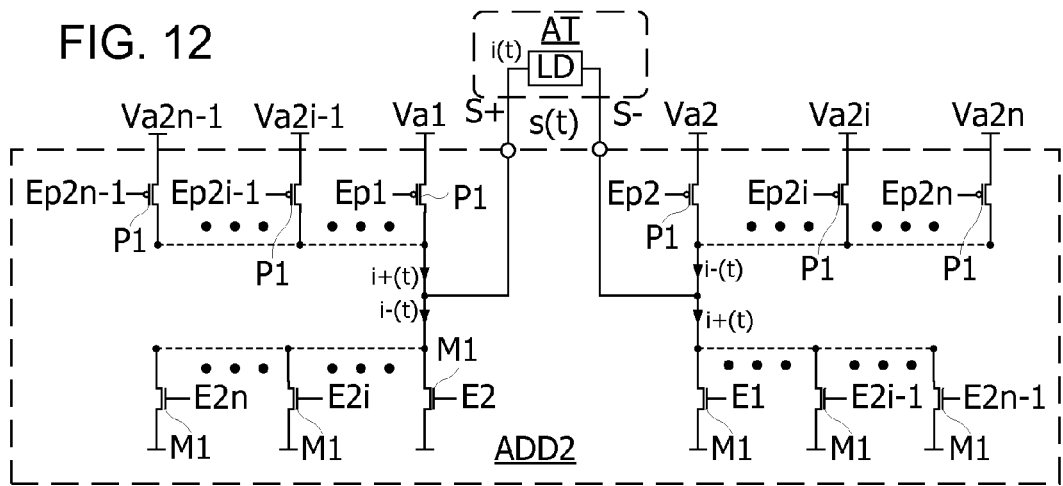

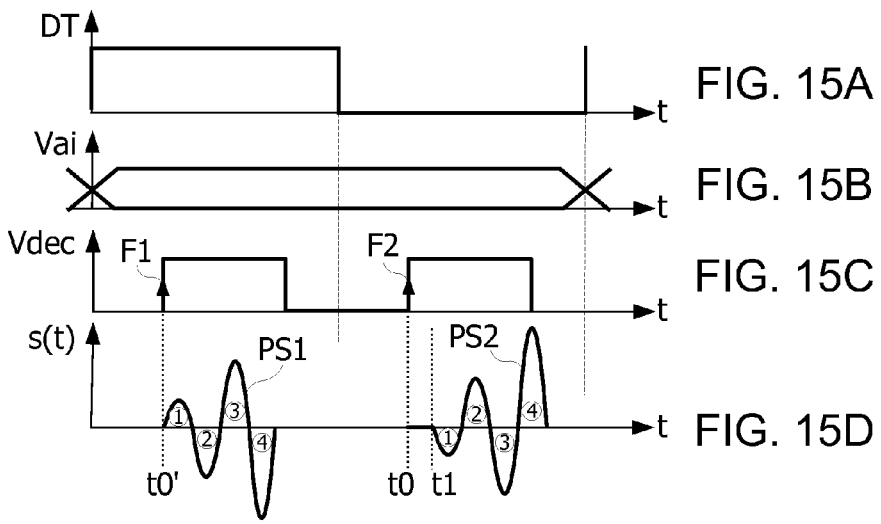
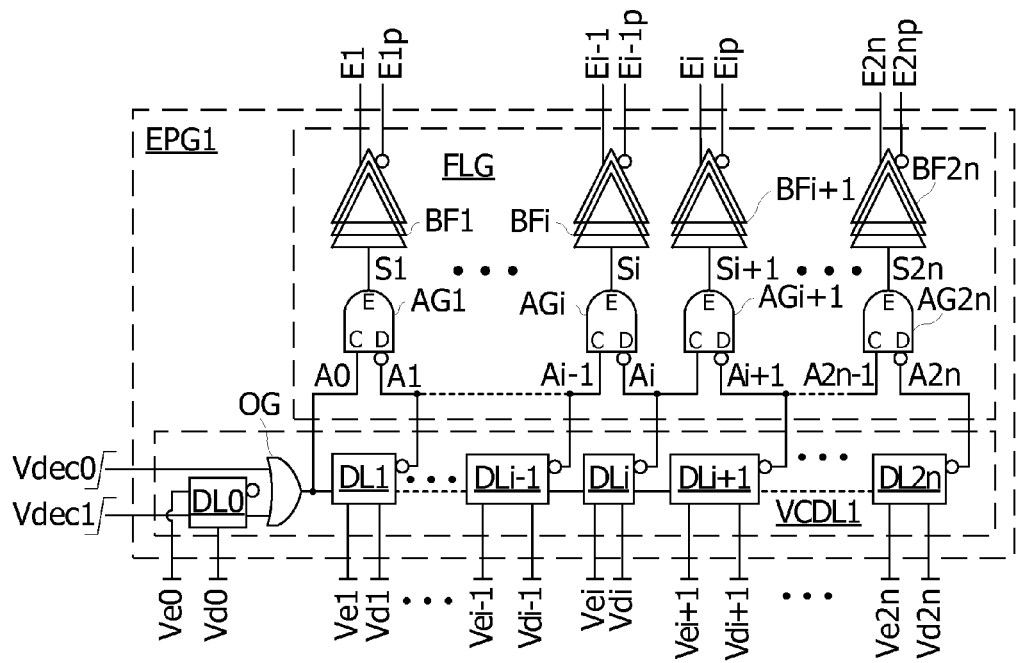

| MA11 | ⋯ | MA1N | MA21 | ⋯ | MA2N | VN |
FIG. 21
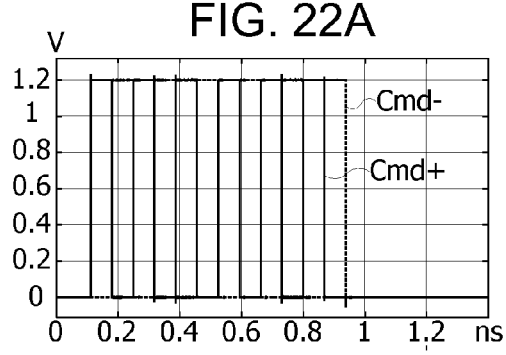
FIG. 22A
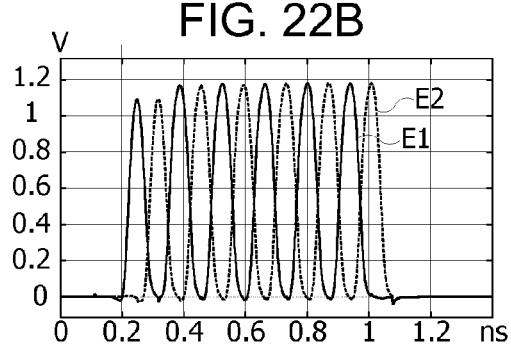
FIG. 22B
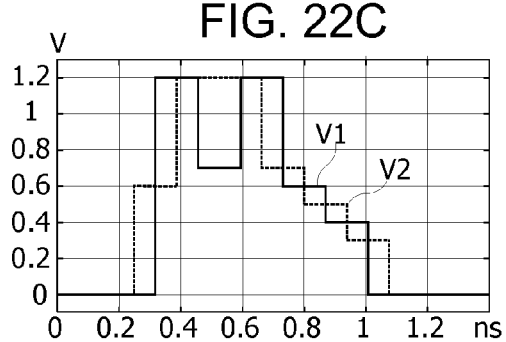
FIG. 22C
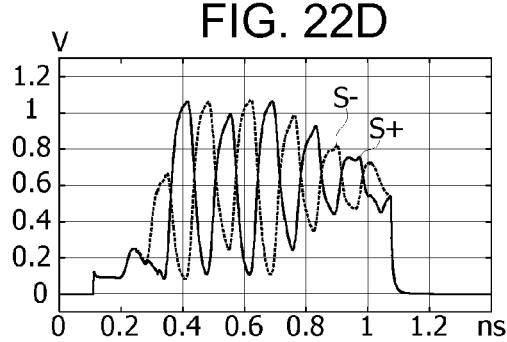
FIG. 22D
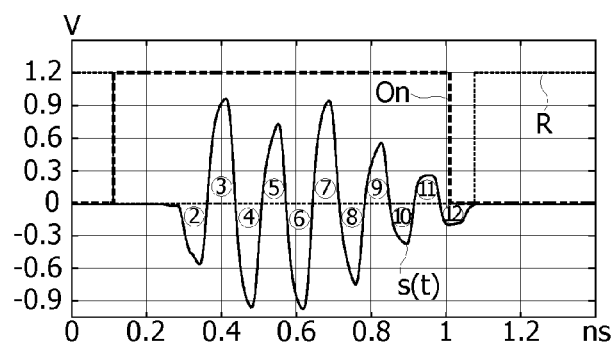
FIG. 22E

METHOD AND DEVICE FOR GENERATING ULTRA WIDE BAND PULSES

BACKGROUND

1. Technical Field

The present disclosure relates to a generator of ultra wide band pulses. The present disclosure applies in particular, but not exclusively to wireless communications.

2. Description of the Related Art

Due to an increasing demand of wireless communications, new frequency bands are allocated to Ultra Wide Band (UWB) transmissions. The width of these frequency bands is such that it allows techniques of transmission by pulses to be implemented which make it possible to simplify the architecture of transmitters and receivers. Indeed, contrary to conventional wireless communications, transmissions by pulse do not require the implementation of functions of frequency synthesis and signal mixing which are demanding in terms of electrical consumption and surface of integrated circuit. However, Power Spectral Density (PSD) constraints have been defined to avoid interferences with other communication systems. In particular, the national commissions for the regulation of transmissions (Federal Communications Commission—FCC in the USA and ETSI—European Telecommunications Standards Institute in Europe) impose power spectral density masks for transmissions by radio pulses UWB-IR, which are implemented by a shaping of the transmitted pulses which is particularly delicate to implement.

To that end, it is known to make a ultra wide band pulse generator using passive circuits and transformers (cf. documents [1], [2] and [3]), or shaping analog filters (cf. document [4]), or Step Recovery diodes (SRD) (cf. document [5]). However, these circuits and components have the drawback of preventing a high integration rate, in particular due to the presence of inductances, or to the fact of not being able to be made in low cost standard CMOS technology, particularly due to the presence of SRD diodes. These techniques also have the drawback of generating only a preset pulse form which is not adaptable.

There are also techniques for generating variable pulses. To that end, it is known to use a local oscillator and a mixer to transpose different pulses produced in baseband, into different frequency bands (cf. documents [6], [7]). However this technique causes leaks and the amplitude of the pulses generated is limited. In addition, the electrical energy consumed by pulse in relation to the pulse amplitude is relatively high.

It has also been suggested to make totally digital pulse generators (cf. documents [8], [9], [10]). However, this solution leads to a frequency and amplitude limitation which depends of the circuit rapidity. Given the performances of the best current integrated circuits, this solution may not be considered to generate pulses of sufficient amplitude (>1 V) beyond 5 GHz.

BRIEF SUMMARY

In this context, it is desirable to make a pulse generator which is as compact as possible and of low electrical consumption, while being able to generate high amplitude pulses which may be used in low cost systems based on energy detection. It is also desirable that the pulse generator may operate in different frequency bands and adapt to different applications. To that end, the pulse generator should be able to synthesize pulses in very wide ranges of shapes and amplitudes, in frequency bands between 500 MHz and some GHz and with a repeatability of several hundred MHz. For cost reasons, it is also desirable that the pulse generator may be made in standard CMOS technology.

It is also desirable to be able to act on the shape of the pulses generated to compensate for operating drift of signal transmission and reception circuits, linked to variations of manufacturing conditions of these circuits, as well as variations of power supply voltage and temperature of these circuits, commonly called "PVT variations" (Process, Voltage, Temperature). The existing systems do not allow the shape of a pulse to be reprogrammed, in particular due to the use of purely passive circuits.

Embodiments relate to a method for generating UWB waveforms, comprising: generating consecutive elementary pulses having durations corresponding to setpoint durations and a substantially constant amplitude, amplifying each elementary pulse separately as a function of a respective setpoint amplitude, and combining the amplified elementary pulses to obtain a waveform successively comprising each of the amplified, alternately positive and negative, elementary pulses.

According to one embodiment, each elementary pulse is generated by combining by a logic operation a signal comprising an edge with this signal previously delayed of a duration corresponding to the setpoint duration of the pulse.

According to one embodiment, the elementary pulses are generated by an oscillator supplying a signal which period may be adjusted at a value corresponding to the setpoint duration.

According to one embodiment, the elementary pulses are amplified and combined in an H-bridge circuit comprising at least a first branch receiving a first pulse and the setpoint amplitude of the first pulse, and at least a second branch receiving a second pulse consecutive to the first pulse and the setpoint amplitude of the second pulse.

According to one embodiment, the elementary pulses are amplified and combined in a H-bridge circuit comprising a first group of several branches each receiving a pulse of odd rank of the waveform to be generated and the setpoint amplitude of the pulse of odd rank, and a second group of several branches each receiving a pulse of even rank and the setpoint amplitude of the pulse of even rank.

According to one embodiment, an elementary pulse is introduced into a branch of the H-bridge circuit through the gate of at least two transistors mounted in series in the branch.

According to one embodiment, the setpoint amplitude of an elementary pulse is introduced into a branch of the H-bridge circuit through the gate of at least two transistors mounted in series in the branch.

According to one embodiment, the method comprises: generating at least two pulse signals (E1, E2) each comprising a stream of elementary pulses (e1, e2, ...) substantially of same amplitude and which duration corresponds to a setpoint duration, the elementary pulses alternately appearing in one and the other of the two pulse streams, for each pulse signal, generating an amplitude signal (V1, V2) supplying for each elementary pulse and during the apparition thereof in the pulse signal, an amplitude setpoint (Va1, Va2, ...) of the elementary pulse, combining the pulse signals and the amplitude signals to obtain a waveform(s) successively comprising each of the amplified, and alternately positive and negative, elementary pulses, the elementary pulses being amplified in accordance with the amplitude setpoint of the elementary pulse, supplied by one of the amplitude signals.

According to one embodiment, the method comprises generating a waveform of positive polarity and generating a waveform of negative polarity, the waveform of negative polarity comprising a same number of elementary pulses as the waveform of positive polarity, each elementary pulse in one of the waveforms having the same amplitude and a polarity opposite to an elementary pulse of same rank in the other waveform.

According to one embodiment, the elementary pulses are amplified and combined in a H-bridge circuit comprising at least one odd branch, and at least one even branch, a waveform of positive polarity being generated by introducing the pulses of odd rank into an odd branch of the H-bridge circuit, and the pulses of even rank into an even branch of the H-bridge circuit, a waveform of negative polarity being generated by introducing the pulses of odd rank into an even branch of the H-bridge circuit, and the pulses of even rank into an odd branch of the H-bridge circuit.

Embodiments also relate to a transmission method comprising generating a waveform of positive or negative polarity, depending on whether a binary data at 0 or 1 is transmitted, and emitting generated waveforms, the waveform of negative polarity comprising a same number of elementary pulses as the waveform of positive polarity, each elementary pulse in one of the waveforms having the same amplitude and a polarity opposite to an elementary pulse of same rank in the other waveform, generating the waveforms comprising: generating consecutive elementary pulses having durations corresponding to setpoint durations and a constant amplitude, amplifying each elementary pulse separately as a function of a respective setpoint amplitude, and combining the amplified elementary pulses to obtain a waveform successively comprising each of the amplified alternately positive and negative, elementary pulses.

According to one embodiment, the elementary pulses are amplified and combined in a H-bridge circuit comprising at least one odd branch, and at least one even branch, a waveform of positive polarity being generated by introducing pulses of odd rank of the waveform into an odd branch of the H-bridge circuit, and the pulses of even rank of the waveform into an even branch of the H-bridge circuit, a waveform of negative polarity being generated by introducing the pulses of odd rank into an even branch of the H-bridge circuit, and the pulses of even rank into an odd branch of the H-bridge circuit.

According to one embodiment, the transmission method comprises a calibration phase comprising several transmission steps for transmitting a calibration message, each transmission step consisting in: generating a different waveform regarding the amplitudes and/or durations of the elementary pulses thereof, identified by a waveform identifier, emitting a calibration message comprising the waveform identifier, using the waveform, and receiving the calibration message and determining a transmission quality measure from the calibration message received, the method comprising a final step of selecting a waveform among the waveforms used to transmit a calibration message, as a function of the transmission quality measures obtained.

Embodiments also relate to a UWB waveform generator comprising an elementary pulse generator configured to supply elementary pulses each having a substantially constant amplitude and a duration adjustable as a function of a setpoint duration, and an adder configured to separately amplify the elementary pulses as a function of a respective setpoint amplitude and combine the amplified elementary pulses so as to obtain a waveform successively comprising each of the amplified, alternately positive and negative, elementary pulses.

According to one embodiment, the generator comprises, for generating each elementary pulse, a circuit comprising a delay cell and a logic circuit combining a binary signal having an edge in input of the delay cell with a signal in output of the delay cell, the delay cell applying to the signal edge in input a delay defined by the setpoint duration which is specific to the elementary pulse.

According to one embodiment, the generator comprises an oscillator producing an output signal having a frequency controlled as a function of the setpoint duration, and defining the duration of the elementary pulses.

According to one embodiment, the adder comprises an H-bridge comprising at least a first branch receiving a first pulse and the setpoint amplitude of the first pulse, and at least a second branch receiving a second pulse consecutive to the first pulse and the setpoint amplitude of the second pulse.

According to one embodiment, the adder comprises a H-bridge comprising a first group of several branches each receiving a pulse of odd rank of the waveform to be generated and the setpoint amplitude of the pulse of odd rank, and a second group of several branches each receiving a pulse of even rank and the setpoint amplitude of the pulse of even rank.

According to one embodiment, each branch of the adder comprises at least two transistors mounted in series in the branch and receiving on the gate thereof an elementary pulse to be amplified and combined.

According to one embodiment, each branch of the adder comprises at least two transistors mounted in series in the branch and receiving on the gate thereof the setpoint amplitude of an elementary pulse.

Embodiments also relate to a transmitter comprising an elementary pulse generator configured to supply elementary pulses each having a substantially constant amplitude and a duration adjustable as a function of a setpoint duration, an adder configured to separately amplify the elementary pulses as a function of a respective setpoint amplitude and combine the amplified elementary pulses so as to obtain a waveform successively comprising each of the amplified, alternately positive and negative, elementary pulses, and a transmitting antenna linked to the adder.

BRIEF DESCRIPTION OF THE SEVERAL VIEWS OF THE DRAWINGS

Embodiments of the disclosure will be described hereinafter, in relation with, but not limited to the appended figures wherein:

FIGS. 1A and 1B show waveforms split up into elementary pulses,

FIG. 2 shows a schematic diagram of a waveform generator according to one embodiment, FIG. 2A shows a chronogram of a waveform generated by the waveform generator, FIG. 3 shows an electrical diagram of an elementary pulse generation circuit of the waveform generator, according to one embodiment, FIG. 4 shows an electrical diagram of a signal adding circuit of the waveform generator, according to one embodiment, FIG. 5 schematically shows the structure of a control word of the waveform generator, FIGS. 10A, 10B, 11A, 11B are curves showing the operation of the waveform generator, FIGS. 12 to 14 are electrical diagrams of signal adding circuits of the waveform generator, according to other embodiments, FIGS. 15A to 15D are chronograms showing the operation of the waveform generator, FIG. 16 is an electrical diagram of an elementary pulse generation circuit of the waveform generator, according to another embodiment.

DETAILED DESCRIPTION

Figure 6:
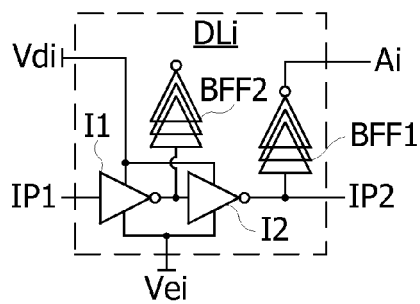
FIGS. 6 to 8 are electrical diagrams of circuits of the elementary pulse generator, according to one embodiment.

A waveform s(t) may be split up into a series of N elementary pulses ei(t) of width (or duration) di and amplitude gi (i varying from 1 to N), in accordance with the following equation (1):

$$s(t) = \sum_{i=1}^{N} gi \cdot ei\left(t - \sum_{j=0}^{i-1} dj\right) \text{ where } d0 = 0 \quad (1)$$

FIG. 1A shows a waveform s(t) corresponding to the impulse response of a bandwidth Bessel filter between 6 and 10 GHz. The values of amplitude gi and duration di of each elementary pulse i of the waveform s(t) are gathered in the following Table 1:

TABLE 1

| i  | 1    | 2    | 3  | 4     | 5    | 6     |
|----|------|------|----|-------|------|-------|
| gi | 0.35 | −0.8 | 1  | −0.75 | 0.37 | −0.12 |
| di | 42   | 48   | 64 | 70    | 80   | 91    |

FIG. 1B shows a waveform s'(t) corresponding to the fifth derivative of a Gaussian pulse. The values of amplitude gi and duration di of each elementary pulse i of the waveform s'(t) are gathered in the following Table 2:

TABLE 2

| i  | 1    | 2     | 3  | 4  | 5    | 6     |
|----|------|-------|----|----|------|-------|
| gi | 0.06 | −0.43 | 1  | −1 | 0.43 | −0.06 |
| di | 85   | 76    | 68 | 68 | 76   | 85    |

FIG. 2 shows a waveform generator PGN, according to one embodiment. In accordance with the principle for splitting up a waveform into elementary pulses, the waveform generator PGN comprises an elementary pulse generator EPG comprising N inputs of setpoint signals of duration Ve1, Ve2, ...VeN, a trigger input Vdec, and N outputs of elementary pulses E1, E2, E3, EN each successively supplying an elementary pulse e1, e2, ... eN. Each elementary pulse output is connected to an amplifier G1, G2, ... GN. The output of each amplifier G1 is connected to an input of an adder ADD. The adder ADD supplies an output signal s(t) for example to an antenna AT. Each signal Ve1 ... VeN defines a setpoint duration of one of the elementary pulses e1 ... eN. Each elementary pulse ei supplied by the generator EPG is delayed in relation to an elementary pulse ei−1 supplied by a previous output of the duration of the latter. Thus, at time t0, the generator EPG supplies on a first output E1 a first pulse e1(t) of duration t1−t0. At time t1, the generator EPG supplies on a second output E2 a second pulse e2(t−t1+t0) delayed of t1−t0 in relation to the first pulse e1(t). At time ti, the generator EPG supplies on an output Ei+1 a pulse ei+1(t−ti+t0) delayed of ti−ti−1 in relation to the previous pulse ei and delayed of ti−t0 in relation to the pulse e1(t).

Each elementary pulse ei is then amplified by one of the amplifiers Gi with a gain defined by an amplitude setpoint signal Vai supplied in input of the amplifier. The setpoint signals Va1 ... VaN may be positive or negative according to the—positive or negative—polarity of the elementary pulse to be generated. The output signals AEi of the amplifiers G1 are supplied in input of the adder ADD.

It is to be noted that the elementary pulses supplied by the generator EPG may all be of same sign, positive or negative, or alternately positive and negative.

FIG. 2A shows the form of the signal s(t) obtained in output of the adder ADD. The combination of the elementary pulses ei(t) made by the adder ADD forms a continuous signal in which the amplified elementary pulses AEi follow each other. The elementary pulses AEi constituting the signal s(t) may be alternately positive and negative so as to generate a band-pass waveform without continuous component.

FIG. 3 shows an embodiment of the elementary pulse generator EPG. The generator EPG comprises a variable delay line VCDL controlled in voltage, logic gates AG1, ... AGi, ...AG2n and output buffers BF1, ... BFi, ...BF2n. The delay line VCDL comprises delay cells DL1, ... DLi, ... DL2n mounted in cascade. Each cell DLi receives one of the duration setpoint signals Vei. A first cell DL1 of the delay line VCDL receives the trigger signal Vdec, which is propagated to the other cells DLi of the delay line VCDL. Each delay cell DLi (i varying from 1 to 2n−1) supplies a signal Ai to an input D of a gate AGi and to an input C of another gate AGi+1. The cell DL2n supplies a signal A2n only to the gate AG2n. Each gate AGi (i varying from 1 to 2n) combines the signals Ai−1, Ai in output of two consecutive cells DLi−1, DLi of the delay line VCDL, to form a digital elementary pulse Si of duration equal to the value of the delay applied by the cell DLi, the signal A0 being equal to the signal Vdec. Each gate AGi comprises an output Si connected to an input of a buffer BFi. Each buffer BFi of differential type comprises two complementary outputs supplying two signals Ei, Epi to the adder ADD, the signal Epi being equal to the power supply voltage of the circuit minus the signal Ei.

Each cell DLi of the line VCDL may in addition receive an inhibition signal Vdi allowing the cell to be inhibited if it is not used, in particular in order to reduce the electrical consumption. Each gate AGi may be an AND gate or any other logic gate allowing two successive edges to be combined to form an elementary pulse. Each buffer BFi may comprise several inverters in series to perform an adaptation between the sizes of the transistors forming the gates AGi, which are small and rapid, and bigger transistors (up to around 1000 times bigger) of transmission gates of the adder ADD, so as to obtain at the buffer output a current sufficient to control the transmission gates of the adder.

FIG. 4 shows an adder ADD1 according to the disclosure, which may be used to implement the adder ADD of FIG. 2. In FIG. 4, the adder ADD1 forms an H-bridge with N=2n branches to supply 2n elementary pulses. The adder ADD1 comprises n branches connected to an output S+ and n branches connected to an output S− of the adder. Thus the adder ADD1 comprises four groups of n transmission gates TGN1 to TGN2$n$, TGP1 to TGP2$n$ mounted in parallel, each gate comprising a N-channel MOS transistor M1 connected in parallel with a P-channel MOS transistor P1. The first group comprises the gates of odd rank TGN1 to TGN2$n$−1 which receive on one side the amplitude setpoint voltages Va1 to Va2$n$−1 respectively, and which are connected on the other side to the output S+ of the adder ADD1. The gate of each transistor M1 of the gates TGN1 to TGN2$n$−1 respectively receives one of the signals E1 to E2$n$−1 of odd rank, coming from the generator EPG. The gate of each transistor P1 of the gates TGN1 to TGN2$n$−1 of odd rank, respectively receives one of the signals Ep1 to Ep2$n$−1 of odd rank, coming from the generator EPG. The second group comprises the transmission gates TGP2 to TGP2$n$ of even rank which are connected on one side to the output S+, and on the other side to the ground. The gate of each transistor M1 of the gates TGP2 to TGP2$n$ of even rank, respectively receives the signals E2 to E2$n$ of even rank, coming from the generator EPG. The gate of each transistor P1 of the gates TGP2 to TGP2$n$ of even rank, respectively receives the signals Ep2 to Ep2$n$ of even rank. The third group comprises the gates TGN2 to TGN2$n$ of even rank, which receive on one side the amplitude setpoint voltages Va2 to Va2$n$ of even rank, respectively, and which are connected on the other side to the output S− of the adder ADD1. The gate of each transistor M1 of the gates TGN2 to TGN2$n$ respectively receives the signals E2 to E2$n$ of even rank, coming from the generator EPG. The gate of each transistor P1 of the gates TGN2 to TGN2$n$ respectively receives the signals Ep2 to Ep2$n$ of even rank, coming from the generator EPG. The fourth group comprises the gates TGP1 to TGP2$n$−1 of odd rank which are connected on one side to the output S−, and on the other side to the ground. The gate of each transistor M1 of the gates TGP1 to TGP2$n$−1 of odd rank, respectively receives the signals E1 to E2$n$−1 of odd rank, coming from the generator EPG. The gate of the transistors P1 of the gates TGP1 to TGP2$n$−1 of odd rank, respectively receives the signals Ep1 to Ep2$n$−1 of odd rank, coming from the generator EPG. The outputs S+, S− of the adder ADD1 are connected to a load LD forming the antenna AT. Thus, the i th branch of the adder (i varying from 1 to 2n) is controlled by the signal Ei and the complement Eip thereof and the signal which goes through it is amplified as a function of the amplitude setpoint voltages Vai.

When an elementary pulse appears in the signals E2$i$−1 and Ep2$i$−1 (i varying from 0 to n), the gates TGN2$i$−1 and TGP2$i$−1 of the branch B2$i$−1 are conductive and a current i+(t) proportional to the voltage Va2$i$−1 goes through the load LD of the antenna AT, from the terminal S+ to the terminal S−, thus producing an elementary pulse of amplitude substantially equal or proportional to the setpoint voltage Va2$i$−1. Then, when an elementary pulse appears in the signals E2$i$ and Ep2$i$ (i varying from 1 to n), the gates TGN2$i$ and TGP2$i$ of the branch B2$i$ are conductive and a current i−(t) proportional to the voltage Va2$i$ and which polarity is opposite to the current i+(t) goes through the load LD, from the terminal S− to the terminal S+, thus producing an elementary pulse of amplitude substantially equal or proportional to the setpoint voltage Va2$i$, but with a polarity opposite to the previous elementary pulse. That way, elementary pulses of alternately positive and negative polarity follow each other in the waveform s(t). Each elementary pulse of the signal s(t) having the duration of a corresponding elementary pulse generated by the generator EPG. The waveform resulting from the combination of such elementary pulses has a band-pass spectrum, i.e. without continuous component if the following condition is verified:

$$\int_{t0}^{tN} s(t) \cdot dt = 0 \qquad (2)$$

The adder ADD1 which has just been described therefore performs both a weighing function (amplification) of each elementary pulse generated by the generator EPG, with a gain which may differs from the amplification gain of the other elementary pulses, and a combination function of these elementary pulses to form the waveform s(t).

FIG. 5 shows the control data structure of the generator PGN. In FIG. 5, the data structure comprises 2n words MAi corresponding to the digital values of the amplitude setpoint voltages Vai fixing the amplitude of each elementary pulse forming the waveform s(t), 2n words VNi corresponding to the digital values of the duration setpoint voltages Vei fixing the width of these elementary pulses, and 2n bits Di fixing the presence or absence of each inhibit voltage Vdi of the cells DLi. The generator PGN may then comprise digital to analog converters to convert these words into voltages Va1 . . . Va2$n$, Ve1 . . . Ve2$n$, Vd1 . . . Vd2$n$.

FIG. 6 shows an embodiment of a cell DLi of the delay line VCDL. Each cell DLi comprises two inverters I1, I2 connected in series, and an inverter buffer BFF1. The input of the inverter I1 is connected to an input IP1 of the cell DLi provided to receive the signal Vdec or be connected to a previous cell DLi−1 of the delay line VCDL. The output of the inverter I1 is connected to the input of the buffer BFF2 and the input of the inverter I2. The output of the inverter I2 is connected to the input of the buffer BFF1 and an output IP2 of the cell DLi provided to be connected to a following cell DLi+1 of the line VCDL. The output of the buffer BFF1 supplies the output signal Ai of the cell DLi. Thus, the cell DLi supplies on the output IP1 thereof the signal applied in input IP1, delayed of a duration corresponding to the accumulated delays introduced by the inverters I1, I2.

A buffer BFF2 identical to the buffer BFF1 may be provided to balance the load of the two inverters I1, I2. The two inverters I1, I2 are also powered between the input of the signal Vdi and the input of the signal Vei. Thus, if the inhibition voltage Vdi is equal to the voltage Vdd, the cell DLi is not powered and therefore does not operate.

Figure 7:
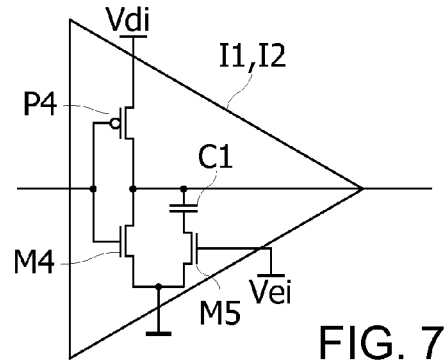

FIG. 7 shows an example embodiment of the inverters I1, I2. Each inverter comprises two N-channel MOS transistors M4, M5, a P-channel MOS transistor and a capacitor C1. The transistors P4 and M4 are connected in series between the signal input Vdi and the ground. The gates of the two transistors P4, M4 are connected to the input of the inverter I1, I2. The drains of the transistors P4, M4 are connected to the output of the inverter I1, I2, as well as the ground through the capacitor C1 in series with the transistor M5. The gate of the transistor M5 receives the signal Vei. Thus, the voltage Vei modulates the current in the branch comprising the transistor M5 and the capacitor C1, which modifies the propagation time of the signal in the inverter I1, I2.

Figure 8:
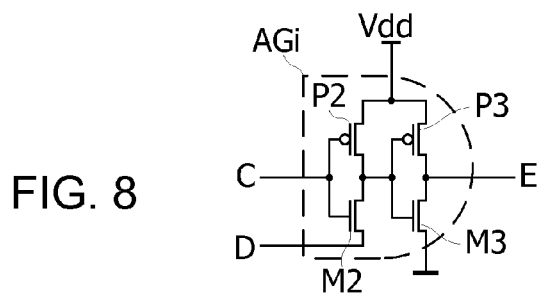
Figure 9A:
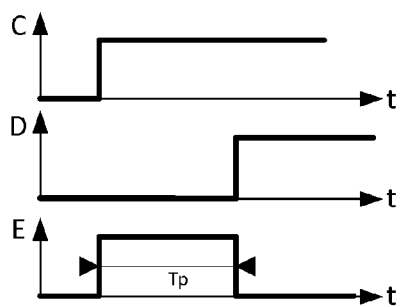
FIGS. 9A to 9D are chronograms showing different cases of operation of a circuit of the elementary pulse generator.

FIG. 8 shows an example embodiment of the gates AGi. In FIG. 8, each gate AGi comprises two P-channel MOS transistors P2, P3 and two N-channel MOS transistors M2, M3. The transistors P2 and M2 are mounted in series between the power supply source Vdd of the circuit and the input D of the gate AGi. The gates of the transistors P2 and M2 are connected to the input C of the gate AGi. The drains of the transistors P2 and M2 are connected to the gates of the transistors P3, M3 which are connected in series between the power supply source Vdd and the ground. The drains of the transistors P3 and M3 are connected to the output E of the gate AGi. The transistors P2 and M2 thus perform the logic function (inverted C) OR D, and the transistors P3 and M3 form an inverter. The gate AGi thus performs the logic function AND C (inverted D) to form an elementary pulse of width Tp between a rising edge in the signal supplied to the input C (Ai−1) and a rising edge supplied to the input D (Ai) of the gate AGi, as shown in the chronograms of FIG. 9A.

Figure 9C:
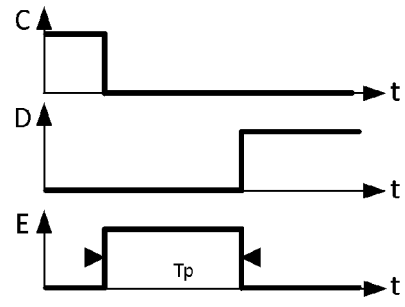
Figure 9B:
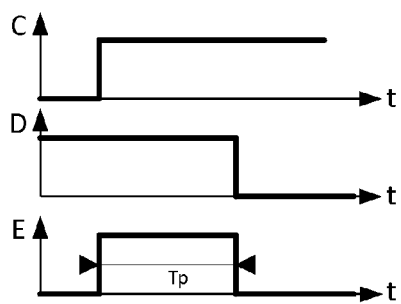
Figure 9D:
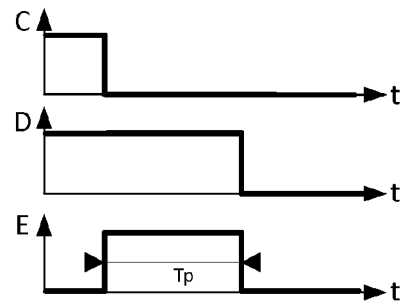

Other types of gates AGi may be provided according to the combination of edges to be made to form the elementary pulses, as shown by the chronograms of the signals C, D and E in FIGS. 9A to 9D. Thus, in FIG. 9A, each gate AGi forms an elementary pulse of duration Tp between a rising edge of the signal C and a rising edge of the signal D. Each gate AGi then performs the logic function C AND (inverted D). In FIG. 9B, each gate AGi forms an elementary pulse of duration Tp between a rising edge of the signal C and a falling edge of the signal D. Each gate AGi then performs the logic function C AND D. In FIG. 9C, each gate AGi forms an elementary pulse between a falling edge of the signal C and a rising edge of the signal D. Each gate AGi then performs the logic function (inverted C) AND (inverted D), equivalent to the logic function (C OR D) inverted. In the example of FIG. 9D, each gate AGi forms an elementary pulse between a falling edge of the signal C and a falling edge of the signal D. Each gate AGi then performs the logic function (inverted C) AND D.

FIGS. 10A, 10B, 11A, 11B are curves showing the operation of the waveform generator. FIG. 10A shows as a function of time a waveform CV1 formed by elementary pulses generated and combined by the generator PGN. FIG. 10B shows the spectrum CV2 of the waveform CV1 and a transmission mask CV3, for example defined by a transmission standard. The transmission mask defines as a function of the frequency, the maximum average power spectral density in dBm/MHz for the transmission signals not to exceed. At frequencies lower than 5 GHz, the average power spectral density CV2 is higher than the mask CV3 and therefore is higher than the authorized limit. FIG. 11A shows as a function of time elementary pulses CV4 generated and combined by the generator PGN. The elementary pulses of curve CV4 are substantially identical to those of curve CV1 except for the fifth elementary pulse which is slightly weakened (at around −0.3 V in FIG. 11A instead of −0.5 V in FIG. 10A). FIG. 11B shows the mask CV3 and the spectrum CV5 of the waveform CV4. It appears in FIG. 11B that the modification of the fifth elementary pulse allows a spectrum of waveform CV5 located substantially below the mask CV3 to be obtained. It may also be noted that the width of the elementary pulses CV4 has been reduced in relation to that of the elementary pulses CV1, which has the effect of widening the bandwidth of the waveform CV4 (around 7.5 GHz in the spectrum CV5) in relation to the waveform CV1 (around 5 GHz in the spectrum CV2).

In the adder ADD1 shown in FIG. 4, the use of transmission gates TGNj and TGPj (j varying from 1 to 2n) allows good performances to be obtained in terms of dynamics of the signal s(t) obtained. However, other transmission gates may be used. Thus, FIG. 12 shows an adder ADD2 according to another embodiment, which may be used to implement the adder ADD of FIG. 2. The adder ADD2 differs from the adder ADD1 in that each transmission gate TGNj is replaced by a simple P-channel MOS transistor P1 and each gate TGPj is replaced by a simple N-channel MOS transistor M1. The introduction of control signals E1 ... E2n and Ep1 ... Ep2n into the adder ADD2 thus appears simplified in relation to that of the adder ADD1. However, this simplification causes a dissymmetry in these control signals, and therefore risks of apparition of glitches which may impair the waveform quality in the output signal s(t).

Figure 13:
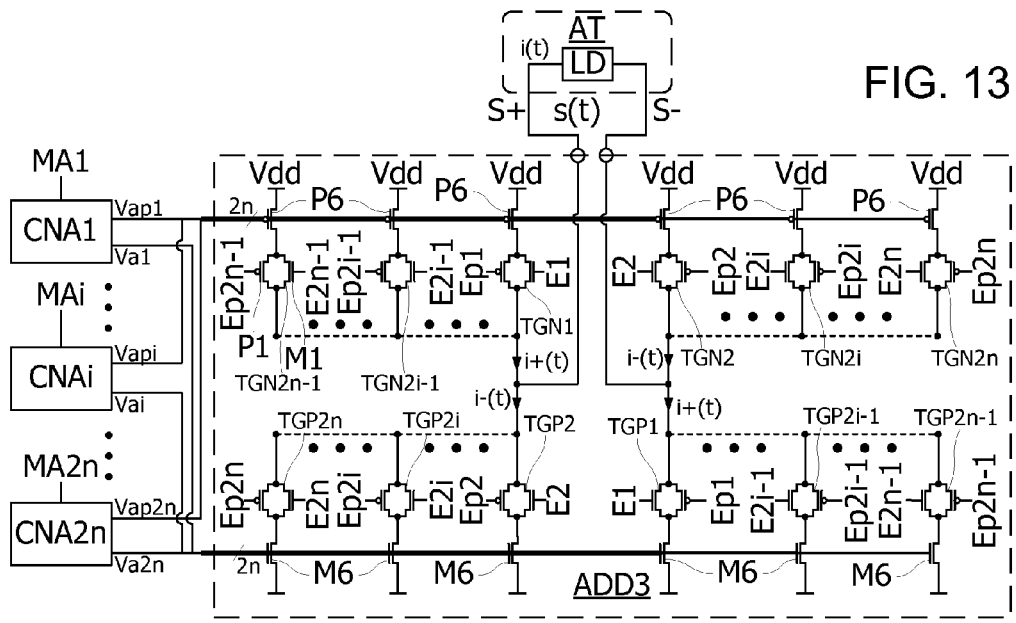

The voltages of Vei, Vdi and Vai may be supplied by digital to analog converters receiving commands in the form of digital values. However, a significant current (several dozens of mA) may pass through the branches of the adder ADD1, ADD2. The result is that the voltages Vai may generally not be supplied by standard digital to analog converters. So as to be able to use standard digital to analog converters to generate amplitude setpoint voltages Vai, the adder may be modified in accordance with FIG. 13. Thus, FIG. 13 shows an adder ADD3, which may be used to implement the adder ADD of FIG. 2, and which differs from the adder ADD1 in that the amplitude setpoint voltages Vai are supplied to the branches of the adder in differential form by two complementary voltages Vai, Vapi, through MOS transistors P6, M6. Thus, the amplitude setpoint voltages Vapi (i varying from 1 to 2n) are supplied to the gates of the P-channel MOS transistors P6 which sources receive the power supply voltage Vdd of the circuit, and the drains are respectively connected to the transmission gates TGNi. The amplitude setpoint voltages Vai (i varying from 1 to 2n) are supplied to the gates of the N-channel MOS transistors M6 which sources are connected to the ground, and the drains are respectively connected to the transmission gates TGPi. Each pair of complementary amplitude setpoint voltages Vai and Vapi (i varying from 1 to 2n) is generated by a digital to analog converter CNAi receiving in input a control word MAi, the voltage Vapi being equal to the power supply voltage Vdd minus the voltage Vai.

That way, the current in a branch of the adder ADD3 is proportional to the voltage Vai applied to the gate of the transistor P6 of the branch and to the voltage Vapi applied to the gate of the transistor M6 of the branch. The adder ADD3 may thus be controlled using digital to analog converters which are not necessarily sized to supply a significant current.

Figure 14:
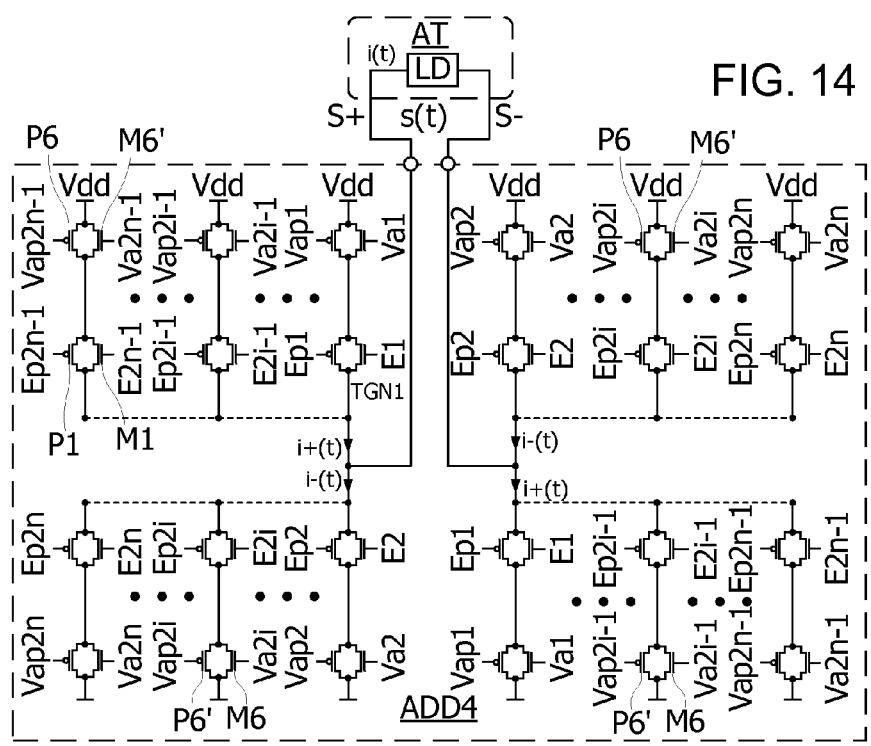

In order to increase the output signal dynamics, the transistors P6 and M6 may be associated to another transistor M6' or P6' so as to form transmission gates. Thus, FIG. 14 shows an adder ADD4 according to another embodiment, which may be used to implement the adder ADD of FIG. 2. The adder ADD4 differs from the adder ADD3 in that the transistors P6 and M6 are replaced by transmission gates, each comprising a transistor P6 receiving on the gate thereof the amplitude setpoint voltage Vapi and a transistor M6 receiving on the gate thereof the amplitude setpoint voltage Vai. Other embodiments of the adder may be considered by replacing only the transistors M6 or only the transistors P6 of the adder ADD3 by transmission gates.

In order to perform bipolar or biphase modulations, the generator PGN which has just been described may generate bipolar waveforms or waveforms of opposite polarities, i.e. comprising a same number of elementary pulses, each elementary pulse in one of the waveforms having the same amplitude and a polarity opposite to the elementary pulse of same rank in the other waveform. The so-called "positive" waveform starts by a positive elementary pulse and the so-called "negative" waveform starts by a negative elementary pulse. To that end, the control voltages of the positive elementary pulses and those of the negative elementary pulses must be shifted by a branch of the adder. Thus, a positive waveform is generated by successively applying the amplitude setpoint voltage Va1 to the branch B1, Va2 to the branch B2, then generally, Vai to the branch B1, and finally Van to the branch B2n. To generate a negative waveform, an amplitude setpoint voltage of 0 V is introduced into the branch B1, then the voltage Va1 is applied to the branch B2, then more generally, the amplitude setpoint voltage Vai is applied to the branch Bi+1. Thus the generation of a negative waveform introduces a delay equal to the delay t1−t0 corresponding to the first elementary pulse at 0 V generated by the first branch B1 of the adder.

FIGS. 15A to 15D are chronograms of signals of the generator PGN showing the generation of bipolar waveforms. FIG. 15A shows a digital data signal DT to be transmitted comprising a 1 followed by a 0. FIG. 15B shows an amplitude setpoint signal Vai in output of one of the digital to analog converters CNAi. FIG. 15C shows the trigger signal Vdec and FIG. 15D shows the signal s(t) in output of the adder. The signal Vdec comprises two rising edges F1, F2 to t0' and t0 which each triggers the generation of a waveform PS1, PS2 consisting of a sequence of 4 elementary pulses. The waveforms PS1 and PS2 are in opposite phase, the waveform PS1 being positive (starting by a positive elementary pulse) to transmit the data at 1 of the signal DT. The waveform PS2 is negative (starting by a negative elementary pulse) to transmit the data at 0 of the signal DT. The waveform PS2 is generated only from the instant t1 after t0, upon the activation of the second branch B2 of the adder.

FIG. 16 shows an elementary pulse generator EPG1, according to another embodiment. The generator EPG1 is modified so as to suppress the time shifting t0−t1 which may induce lines in the spectrum of the waveforms generated and which may impair the quality of the signal. To that end, the circuit EPG1 differs from the circuit EPG in that it comprises a modified trigger signal input to delay by t1−t0 the generation of the positive waveforms in relation to the negative waveforms. Thus, the generator EPG1 comprises a trigger signal input Vdec1 to trigger the generation of a positive waveform and a trigger signal input Vdec0 to trigger the generation of a negative waveform. The generator EPG1 also comprises an additional delay cell DL0 receiving the trigger signal Vdec1, a duration setpoint signal Ve0 and an inhibition control signal Vd0. The output IP2 (FIG. 6) of the cell DL0 is connected to an input of a logic gate OG of OR type another input of which receives the trigger signal Vdec0. The output of the gate OG is linked to the input IP1 (FIG. 6) of the cell DL1. The signals Vdec0 and Vdec1 correspond for example to signals for controlling the emission of a binary data DT at 0 and at 1.

When a waveform of positive polarity must be generated, the duration setpoint signal Ve0 is equal to the signal Ve1 of the first elementary pulse of the waveform and a triggering pulse appears in the signal Vdec1. The cells DL0 and DL1 receive the duration setpoint signal Ve1 and more generally, the cell DLi receives the duration setpoint signal Vei. In addition, the branch B1 of the adder receives the amplitude setpoint signal Va1 (or Va1 and Vap1) and more generally the branch Bi of the adder receives the amplitude setpoint signal Vai (or Vai and Vapi). When a negative waveform must be generated, a triggering pulse appears in the signal Vdec0. The cells DL1 and DL2 receive the duration setpoint signal Ve1 and more generally, the cells DLi receive the duration setpoint signal Vei−1. In addition, the branch B1 of the adder receives an amplitude setpoint signal at 0 V. The branch B2 of the adder receives the amplitude setpoint signal Va1 (or Va1 and Vap1) and more generally the branch Bi+1 of the adder receives the amplitude setpoint signal Vai (or Vai and Vapi). That way, the initial delay with which the positive waveforms are generated is equal to the initial delay necessary for the generation of the negative waveforms.

The generator EPG1 may then comprise an additional set (or more) of a delay cell DL2n+1, a gate AG2n+1 and a buffer BF2n+1. During the generation of a negative waveform, the delay cell DL2n+1 receives the signal Ve2n and the buffer BF2n+1 supplies the signals E2n+1 and EP2n+1. Likewise, the adder may comprise an additional branch B2n+1 (or more) receiving the amplitude setpoint signals Va2n (or Va2n and Vap2n), as well as the signals E2n+1 and EP2n+1, during the generation of a negative waveform.

It is to be noted that the generator EPG, EPG1 does not necessarily comprise an even number of outputs and the adder ADD, ADD1, ADD2, ADD3, ADD4 does not necessarily comprise an even number of branches, these numbers may also be odd, given that the waveforms generated do not necessarily comprise an even number of elementary pulses. In that case, the adder may comprise an odd branch more than the even branches. However, the number of even branches may be maintained equal to the number of odd branches in order to balance the loads. The unused branches may be controlled by applying thereto a signal Vai at 0.

The waveform generator PGN which has just been described has a limitation in terms of maximal number of elementary pulses which it may combine to generate a waveform. This limitation results from the length of the connections between the branches of the adder ADD, ADD1-ADD4 and the nodes S+ and S−. The length of these interconnections is proportional to the number of branches of the adder, corresponding to the number of maximum elementary pulses to be combined. The length of these interconnections limits the maximum frequency of the pulses susceptible of being produced by the generator EPG. Now the narrower the bandwidth of the waveforms to be generated is, the higher the number of elementary pulses required for the generation thereof. The minimum number Nm of elementary pulses necessary to generate a waveform s(t) depends on the central frequency f0 of the waveform and the bandwidth BW of the latter in accordance with the following equation:

$$Nm \approx \frac{4 \cdot f0}{BW} \qquad (2)$$

Some examples of values of f0, BW and Nm are given in the following Table 3:

TABLE 3

| f0 | 3.35 | 3.75 | 3.75 | 3.75 | 4 | 7 | 8 |
|---|---|---|---|---|---|---|---|
| BW | 0.5 | 0.5 | 0.75 | 1 | 2 | 7 | 0.5 |
| Nm | 26.8 | 30 | 20 | 15 | 8 | 4 | 64 |

Thus, to generate a waveform of BW=500 MHz of width centered on a frequency f0=8 GHz, Nm=64 elementary pulses minimum must be combined.

Figure 17:
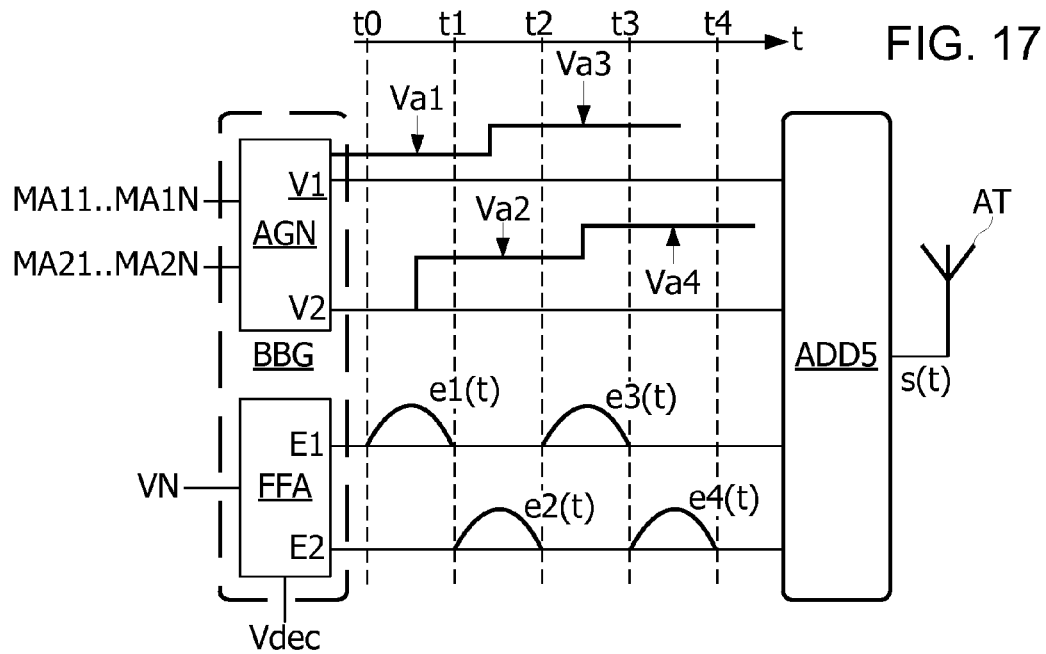
FIG. 17 shows a schematic diagram of a waveform generator according to another embodiment.

FIG. 17 shows a generator PGN1, according to another embodiment. The generator PGN1 comprises an elementary pulse generator BBG and an adder ADD5 supplying a signal s(t) to an antenna AT. The generator BBG comprises an elementary pulse generation circuit FFA receiving a trigger signal Vdec and a control word VN. The circuit FFA is configured to supply a stream of odd elementary pulses e1(t), e3(t), ... on an output E1, and a stream of even elementary pulses e2(t), e4(t), . . . on an output E2, the elementary pulses having a substantially fixed amplitude and alternately appearing in the two pulse streams at a fixed frequency defined by a control word VN. The generator BBG also comprises a control voltage generation circuit AGN receiving a first series of N control words MA11 to MA1N respectively defining setpoint amplitudes of odd or positive elementary pulses to be successively generated, and a second series of N control words MA21 to MA2N respectively defining setpoint amplitudes of even or negative elementary pulses to be successively generated. The circuit AGN is configured to supply on two outputs V1, V2, voltages corresponding to the amplitudes of the elementary pulses supplied by the circuit FFA. At any time, the signal V1 defines the amplitude of a common elementary pulse appearing at the output E1, and the signal V2 defines the amplitude of a common elementary pulse appearing at the output E2. The outputs E1, E2, V1, V2 are connected to the adder ADD5. Thus, the adder ADD5 receives at the same time an elementary pulse through one of the outputs E1, E2 and the amplitude of this pulse through the corresponding output V1 or V2.

Figure 17A:
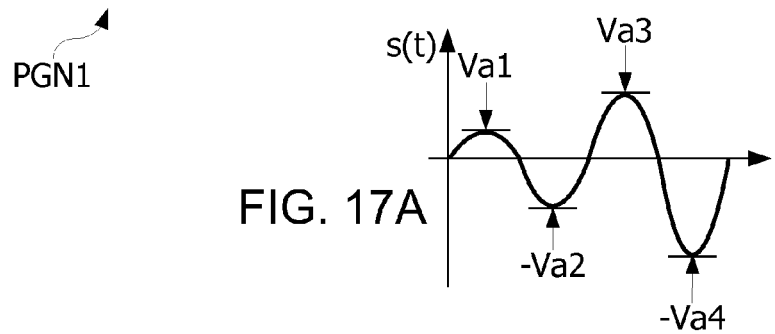
FIG. 17A shows a chronogram of a waveform generated by the waveform generator of FIG. 17, FIGS. 18 to 20 are electrical diagrams of circuits of the waveform generator of FIG. 17, according to one embodiment, FIG. 21 schematically shows the structure of a control word of the waveform generator of FIG. 17, FIGS. 22A to 22E are curves showing the operation of the waveform generator of FIG. 17, FIGS. 23 and 24 are electrical diagrams of circuits of the waveform generator of FIG. 17, according to another embodiment.

At a time t0, the circuit AGN receives the trigger signal Vdec and supplies on the output V1 a signal at the voltage Va1 corresponding to the control word MA11, and the circuit FFA supplies on the output E1 a pulse e1(t) of duration t1–t0. Between the times t0 and t1, the circuit AGN brings the voltage at the output V2 to Va2 corresponding to the control word MA21. At time t1, the circuit FFA supplies on the output E2 a pulse e2(t) of duration t2–t1. Between the times t1 and t2, the circuit AGN supplies on the output V1 a signal at the voltage Va3 corresponding to the control word MA12. At time t2, the circuit FFA supplies on the output E1 a pulse e3(t) of duration t3–t2. Between the times t2 and t3, the circuit AGN brings the voltage at the output V2 to a voltage Va4 corresponding to the control word MA22. At time t3, the circuit FFA supplies on the output E2 a pulse e4(t) of duration t4–t3. The adder ADD5 receives and combines the signals V1, V2, E1, E2 so as to supply a waveform s(t) successively comprising the pulses e1, e2, e3 and e4 which have a same duration corresponding to the control word VN, and respective amplitudes Va1, –Va2, Va3 and –Va4, as shown in FIG. 17A which shows a chronogram of the signal s(t). In other words, the adder ADD5 combines the signals of V1, E1 so as to supply the positive, odd elementary pulses e1, e3, in the waveform s(t), and combines the output signals V2, E2 so as to supply the negative or even elementary pulses e2, e4 in the waveform s(t).

It is to be noted that the number of odd elementary pulses making the waveform is not necessarily equal to the number of even elementary pulses, and may be equal to N+1 while the number of even elementary pulses is equal to N.

Figure 18:
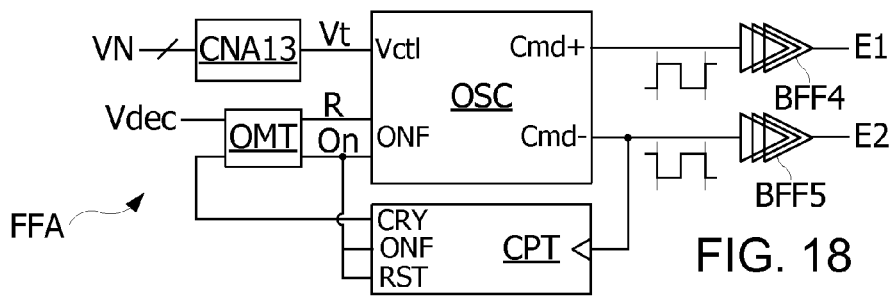

FIG. 18 shows the elementary pulse generation circuit FFA, according to one embodiment. The circuit FFA comprises a digital to analog converter CNA13, an oscillator OSC for example of the type voltage controlled oscillator with differential output, a counting circuit CPT and a triggering management circuit OMT. The converter CNA13 receives a voltage control word VN and outputs a control voltage Vt to a control input Vct1 of the frequency of the oscillator OSC. The circuit OMT comprises an input receiving the trigger signal Vdec and two outputs supplying to the oscillator OSC a reset signal R and an On/Off control signal ON. The oscillator OSC comprises two complementary outputs Cmd–, Cmd+, each connected to a buffer BFF4, BFF5. The signal at the output Cmd– is equal to the power supply voltage of the circuit Vdd minus the signal at the output Cmd+. The signals at the outputs Cmd– and Cmd+ are therefore in phase opposition. The buffers BFF4, BFF5 supply the signals E1, E2. The signals E1 and E2 are therefore also in phase opposition. Each buffer BFF4, BFF5 may comprise several inverters in series to perform an adaptation between the sizes of the transistors making the oscillator OSC and bigger transistors (up to around 1000 times bigger) of transmission gates making the adder ADD5, so as to obtain at the output of the buffer a current sufficient to control the transmission gates of the adder. The counter CPT is clocked by one or the other signal E1, E2, for example the signal E2, and comprises a trigger input ONF and a reset input RST, both receiving the signal ON at the output of the circuit OMT. The counter CPT supplies a carry signal CRY to the circuit OMT when it reaches a maximum number and returns to 0. The value of the counter CPT is fixed to N, 2N being the number of elementary pulses to be generated. The circuit OMT comprises for example a logic gate receiving in input the signals Vdec and CRY and supplying the signal ON for example equal to Vdec AND (inverted CRY). The signal R may be generated from the signal CRY and delay lines defining a first delay between the apparition of the signal CRY and the setting to 1 of the signal R and a second delay defining the duration during which the signal R remains at 1.

It is to be noted that the set formed by the oscillator OSC and the converter CNA13 may be replaced by a digitally controlled oscillator NCO.

Figure 19:
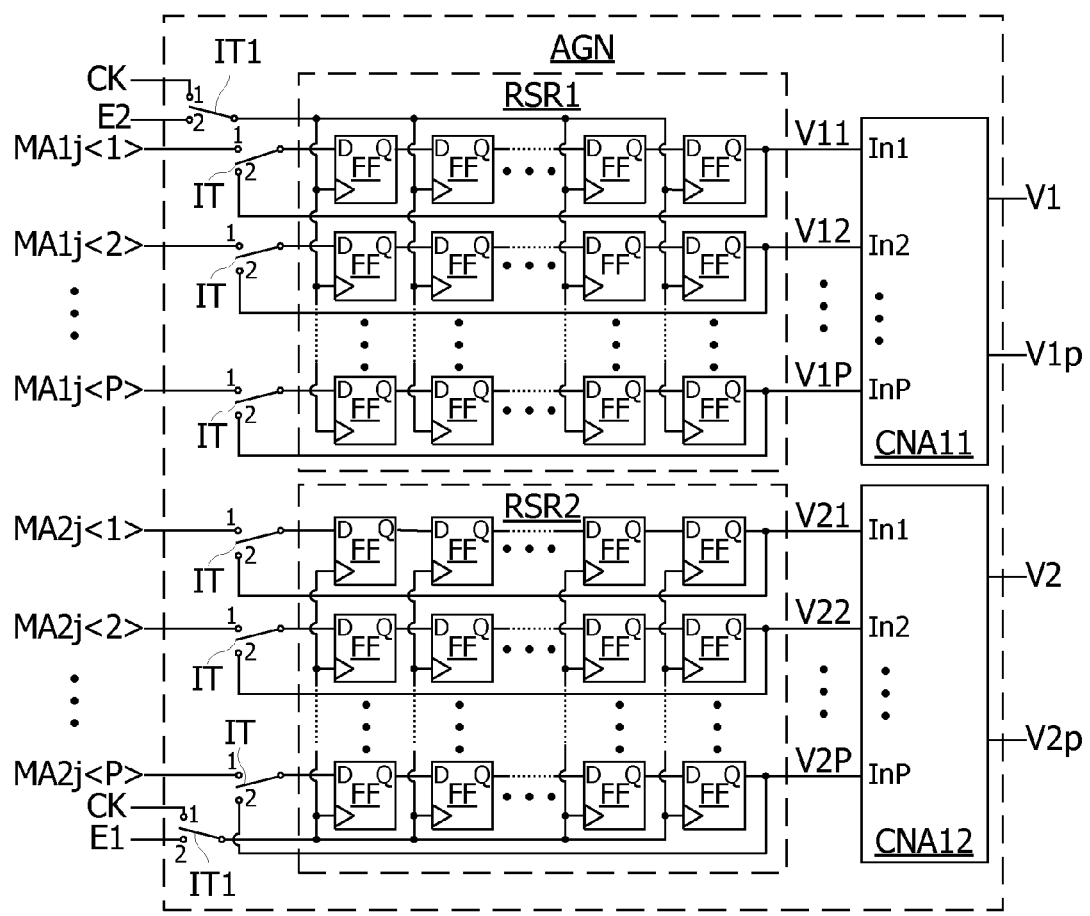

FIG. 19 shows the voltage generation circuit AGN, according to one embodiment. The circuit AGN receives in input the bits 1 to P of the N control words MA11 to MA1N and the N control words MA21 to MA2P. The circuit AGN comprises two sets RSR1, RSR2 of P shift registers, and two digital to analog converters CNA11, CN12. Each shift register comprises N flip-flops FF for example of D type. Each set RSR1, RSR2 successively receives in input through switches IT (one switch per shift register) the bits (from 1 to P) of the words MA11 . . . MA1N or MA21 . . . MA2N. The series of words MA11 . . . MA1N introduced into the set RSR1 fixes the amplitudes of N odd or positive elementary pulses, and the series of words MA21 . . . MA2N introduced into the set RSR2 fixes the amplitudes of N even or negative elementary pulses. The outputs V11 to V1P or V21 to V2P of each of the two sets of registers RSR1, RSR2 are connected to a terminal of the switches IT and to inputs IN1 to INP of one of the two converters CNA11, CNA12. The flip-flops FF of the set of shift registers RSR1 receiving the control words MA1j are clocked by a clock signal CK, or by the signal E2 at the output of the circuit FFA, the signal clocking the flip-flops being selected by a switch IT1. The flip-flops FF of the set of shift registers RSR2 receiving the control words M2j are clocked by the clock signal CK, or by the signal E1 at the output of the circuit FFA, selected by a switch IT1. The number of flip-flops FF of the shift registers of each of the sets RSR1, RSR2 corresponds to the maximum number of elementary pulses, respectively odd and even, to be generated to form the waveform s(t).

The converter CNA11 of differential type comprises two outputs supplying complementary voltages V1, V1p. The voltage V1 corresponds to the digital value defined by the bits V11 . . . V1P and the voltage V1p is equal to the power supply voltage of the circuit Vdd minus the voltage V1. The converter CNA12 also of differential type, comprises two outputs supplying complementary voltages V2, V2p. The voltage V2 corresponds to the digital value defined by the bits V21 . . . V2P and the voltage V2p is equal to the power supply voltage of the circuit Vdd minus the voltage V2.

During an initialization phase, the switches IT, IT1 are in position 1 to load the shift registers RSR1, RSR2 with the bits (from 1 to P) of the two series of N control words MA11 to MA1N and MA21 to MA2N at any clock frequency CK. At the end of the initialization phase, the shift registers RSR1, RSR2 contain all the digital values of the amplitudes of the elementary pulses to be generated to form a waveform. In an operating phase, the switches IT, IT1 are in position 2 so as to loop the output on the input of the shift registers, and to clock the latter by the signals E1, E2. At the end of N falling edges in each of the signals E1, E2, 2N elementary pulses have been generated and the shift registers are back to their initial values, ready to generate another identical waveform in the signal s(t). Thus during the operating phase, the signal V1 is successively equal to the setpoint amplitudes Va1, Va3, . . . Va2i−1, . . . of the odd pulses, and changes value at each rising edge of the signal E1. Likewise, the signal V2 is successively equal to the setpoint amplitudes Va2, Va4, . . . Va2i, . . . of the even pulses, and changes value at each rising edge of the signal E2.

Figure 20:
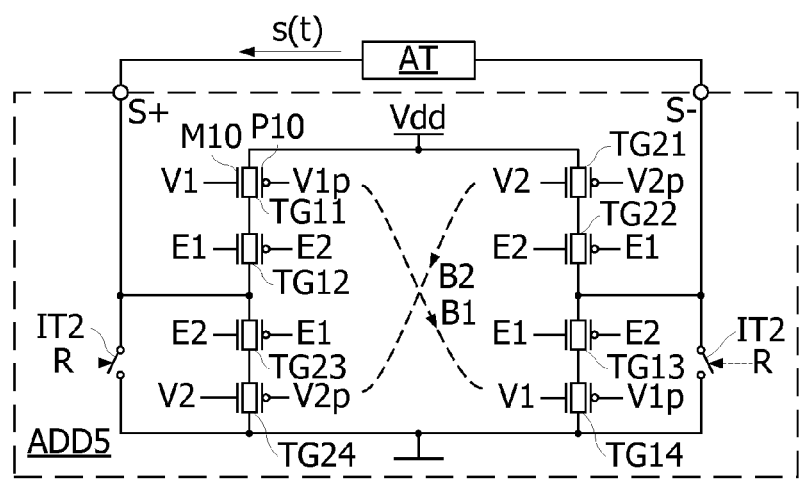

FIG. 20 shows the adder ADD5, according to one embodiment. The adder ADD5 comprises a H-bridge with two branches, i.e. four half branches, two of which are connected between the power supply voltage source Vdd and connection terminals S+, S− for connecting to the antenna AT, and two of which are connected between the terminals S+, S− and the ground. Each half branch comprises two transmission gates TG11 to TG14 and TG21 to TG24 connected in series, each gate comprising a P-channel MOS transistor P10 and an N-channel MOS transistor M10. The terminals S+ and S− are also linked to the ground through switches IT2 controlled by the signal R.

A first half branch comprising the gates TG11 and TG12 in series is connected between the power supply voltage source Vdd and the terminal S+ of the antenna AT. A second half branch comprising the gates TG13 and TG14 in series is connected between the terminal S− and the ground. The transistor M10 of the gates TG12 and TG13 receives on the gate thereof the voltage E1, and the transistor P10 of the gates TG12 and TG13 receives on the gate thereof the voltage E2. The transistor M10 of the gates TG11 and TG14 receives on the gate thereof the voltage V1, and the transistor P10 of the gates TG11 and TG14 receives on the gate thereof the voltage V1$p$. A third half branch comprising the gates TG21 and TG22 in series is connected between the power supply voltage source Vdd and the terminal S−. A fourth half branch comprising the gates TG23 and TG24 in series is connected between the terminal S+ and the ground. The transistor M10 of the gates TG22 and TG23 receives on the gate thereof the voltage E2, and the transistor P10 of the gates TG22 and TG23 receives on the gate thereof the voltage E1. The transistor M10 of the gates TG21 and TG24 receives on the gate thereof the voltage V2, and the transistor P10 of the gates TG21 and TG24 receives on the gate thereof the voltage V2$p$. The first and second half branches form a branch B1 which is conductive when the signals V1 and E1 are near the power supply voltage Vdd and when the signals V1$p$ and E2 are near 0 V. The third and fourth half branches form a branch B2 which is conductive when the signals V2 and E2 are near the power supply voltage Vdd and when the signals V2$p$ and E1 are near 0 V. As the signals E1 and E2 are in phase opposition, the duration of the elementary pulses in output of the adder ADD5 is therefore equal to half the oscillation period of the oscillator OSC. In addition, as the shift registers RSR1, RSR2 are clocked by the signals E1 and E2, the signals V1, V1$p$ are synchronous with the signal E1, and the signals V2, V2$p$ are synchronous with the signal E2. The signals V1, V1$p$, V2, V2$p$ define the amplitude of the elementary pulses generated in the waveform s(t) and the signals E1, E2 define the duration of these pulses.

At the end of the generation of a waveform in the signal s(t), the signal R controls the closing of the switches IT2 to unload the H-bridge of the adder ADD5. The signal R is such that it closes the switches IT2 sometimes after the oscillator OSC stopping to take into account the propagation time of the signals in the circuits of the generator PGN1.

It is to be noted that the adder may also be of the type shown in FIG. 4 with only two branches receiving the voltages V1 and V2 and a transmission gate per half branch receiving the signals E1, E1$p$ or E2, E2$p$.

FIG. 21 shows the control data structure of the generator PGN1. The control data of the generator PGN1 comprise the series of control words MA11 to MA1N, MA21 to MA2N fixing the amplitudes of the N odd elementary pulses and the N even elementary pulses generated in the resulting signal s(t), and the control word VN fixing the duration of these 2N elementary pulses.

FIGS. 22A to 22E show variation curves as a function of time of different voltages in the generator PGN1. These curves have been obtained with series of control words MA11 to MA16 and MA21 to MA26 such that they define respective setpoint amplitudes equal to 0, 0.6, 1.2, 1.2, 0.7, 1.2, 1.2, 0.7, 0.6, 0.5, 0.4 and 0.3 for twelve elementary pulses, the words MA11 . . . MA16 defining the amplitudes of the odd elementary pulses, and the words MA21 . . . MA26 defining the amplitudes of the even elementary pulses. FIG. 22A show variation curves of the voltages of the control signals Cmd+ and Cmd−. Each signal Cmd+, Cmd-comprises a stream of six pulses of same amplitudes and having the form of a positive square signal and which duration is equal to around 70 ps. During these pulse streams, the signals Cmd+ and Cmd− are in phase opposition.

FIG. 22B show variation curves of the voltages of the signals E1, E2. Each signal E1, E2 comprises a stream of six pulses substantially of same amplitude (with a possible difference of 10%) and are in phase opposition. The pulses of the signal E1 are substantially synchronous with the pulses of the signal Cmd+ with a possible difference of half a period of the signal Cmd+ or Cmd−, this delay being due to the propagation time of the signals in the inverters. The form of the pulses of the signals E1, E2 is rounded in relation to the signals Cmd+ and Cmd− due to the presence of the buffers BFF4, BFF5.

FIG. 22C show variation curves of the voltages of the signals V1, V2. Each signal V1, V2 comprises a sequence of six voltage steps, these two signals being shifted one in relation to the other of around half a period of the signal Cmd+ or Cmd−. FIG. 22D shows the form of the signals S+ and S− at the output terminals of the adder ADD5. Each signal S+ and S− comprises a stream of positive pulses of variable amplitude and shifted one in relation to the other of half a period of the signal Cmd+ or Cmd−. FIG. 22E shows the signals R, ON and s(t). The signal ON is at 0 V except during the period where pulses are present in the signals Cmd− and Cmd+ where it is at the voltage Vdd. The signal R is at 0 V during the period where the signal ON is at Vdd, and switches to Vdd during a certain duration when the signal ON is at 0 V. The signal s(t) comprises a sequence of pulses comprising pulses corresponding in duration and amplitude to the pulses of the signal S+, and pulses corresponding in duration and amplitude to the pulses of the signal S− but reverted.

The signal R opens the switches IT2, and the signal ON goes to 1. The oscillator OSC starts and starts supplying signals Cmd+, Cmd− different from zero. In parallel, the shift registers RSR1, RSR2 supply voltages V1, V2, V1P, V2P different from zero while elementary pulses are generated in the signals E1, E2. After the generation of the twelve elementary pulses, the counter CPT supplies a counting end signal CRY which causes the signal ON to go to 0 and therefore the oscillator OSC to stop. After some times, corresponding to the propagation time of the pulses in the circuits, the signal R goes to 1 to control the switches IT2 and thus unload the H bridge of the adder ADD5.

It may be noted in FIG. 22E that the signal s(t) obtained comprises eleven elementary pulses (the first elementary pulse having a setpoint amplitude equal to 0), alternately negative and positive, and having amplitudes substantially equal to those mentioned above. The amplitude difference which may be observed between the setpoint amplitudes and the amplitudes obtained is not strictly linear. It may be observed that these nonlinearities are all the more important that the generator operates at high frequency (higher than 3 GHz), but may be reduced using a more efficient technology for manufacturing integrated circuits. In addition, the possibility of acting on the amplitude of each elementary pulse may be taken advantage of to compensate these nonlinearities, without penalizing the operation of the generator. This possibility may also be taken advantage of to compensate variations of operation features of the integrated circuit in which the generator is made, resulting from variations PVT (manufacturing conditions of the circuit, power supply voltage of the circuit, operating ambient temperature of the circuit).

It is to be noted that the adder may comprise more branches, for example 4 or 6, or more generally B branches. If the adder comprises B branches, the circuit AGN may comprise B sets of shift registers receiving B sets of control words MA11 ... MA1N to MAB1 ... MABN, and as many analog to digital converters CNA11 to CNA1B supplying pairs of complementary voltages V1, V1P to VB, VBp. The frequency of the oscillator OSC is then adjusted to 1/(B·Tp), where Tp is the duration of the elementary pulses. The oscillator supplies B signals E1 to EB having phases uniformly distributed on a period of the oscillator.

Figure 23:
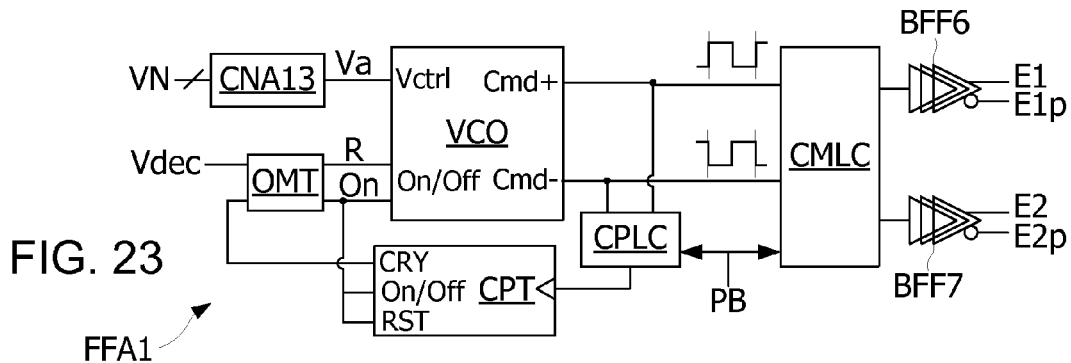

So as to generate bipolar waveforms in the signal s(t), i.e. successively and alternately starting by a positive and negative elementary pulse, the generator PGN1 may be modified so that the first elementary pulse may be generated as one chooses in the branch B1 or the branch B2 of the adder ADD5. To that end, the generator PGN1 comprises an elementary pulse generation circuit FFA1 as shown in FIG. 23. The circuit FFA1 differs from the circuit FFA in that it comprises an additional control logic circuit CMLC and counting logic circuit CPLC. The circuit CMLC is configured to direct the complementary outputs Cmd+ and Cmd− of the oscillator OSC to complementary outputs E1 and E1p or E2 and E2p depending on whether a negative or positive waveform is to be generated. The polarity of the waveform to be generated is defined by a polarity control signal PB. The circuit CMLC implements the following truth table:

TABLE 4

| PB | E1 | E1p | E2 | E2p |
|---|---|---|---|---|
| 0 | Cmd+ | Cmd− | Cmd− | Cmd+ |
| 1 | Cmd− | Cmd+ | Cmd+ | Cmd− | where the signal PB is at 0 to generate a positive waveform s(t), and at 1 to generate a negative waveform.

The circuit CMLC supplies through buffers, for example two buffers of differential type BFF6, BFF7, two pairs of complementary signals E1, E1p and E2, E2p. The circuit CPLC makes it possible to select as a function of the signal PB among the signals Cmd+ or Cmd−, the signal which falling edges trigger a counting of the counter CPT. Thus, the circuit CPLC supplies at the counting input of the counter CPT the signal Cmd− if the signal PB is at 0 and the signal Cmd+ if the signal PB is at 1.

Figure 24:
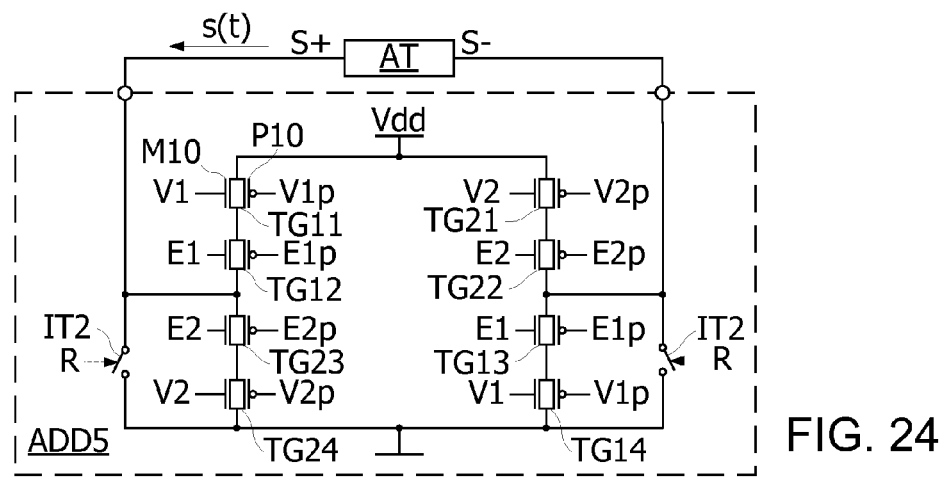

FIG. 24 shows the adder ADD5 and in particular its connection mode for connecting to the circuit FFA1. The connection mode of the circuit FFA1 for connecting to the adder ADD5 differs from that shown in FIG. 20 in that the gate of the transistor M10 of each gate TG12, TG13 receives the signal E1, the gate of the transistor P10 of each gate TG12, TG13 receives the signal E1p, the gate of the transistor M10 of each gate TG22, TG23 receives the signal E2, and the gate of the transistor P10 of each gate TG22, TG23 receives the signal E2p.

The connection mode of the adder ADD5 for connecting to the circuit AGN remains unchanged (like in FIG. 20), but the circuit AGN is modified to comprise a circuit of the type CMLC allowing the signals V1, V1p to be replaced by the signals V2, V2p and vice versa, during the generation of a negative waveform. That way, depending on the polarity of the waveform to be generated, during the generation of the first elementary pulse, the signals E1, E1p correspond either to the signals Cmd+, Cmd−, or to the signals Cmd−, Cmd+ and inversely for the signals E2, E2p. The result is that the first elementary pulse of the waveform is generated either by the first branch producing a positive elementary pulse, or by the second branch of the adder ADD5 producing a negative elementary pulse. Instead of providing a circuit of the type CMLC which may introduce differences between the positive and negative pulses, it may be provided to duplicate the number of shift registers at the input of the analog to digital converters, with a set of registers being provided for the positive pulses and a set of registers for the negative pulses. Switches may also be provided for selecting one of the two sets of registers as a function of the polarity of the waveform to be generated.

The generators PGN, PGN1 are adapted to the compensation of the variations PVT. Two compensation techniques may be implemented, separately or combined. A first technique consists in performing a calibration at manufacture output. This calibration consists in listing all the waveforms to be generated for a given application and determining the control words allowing each waveform to be obtained.

A second technique consists in performing a dynamic calibration of the generator, during the operation thereof, so as to maintain sufficient performances, for example a maximum error rate on the bits (TEB) as a part of a data transmission.

Figure 25:
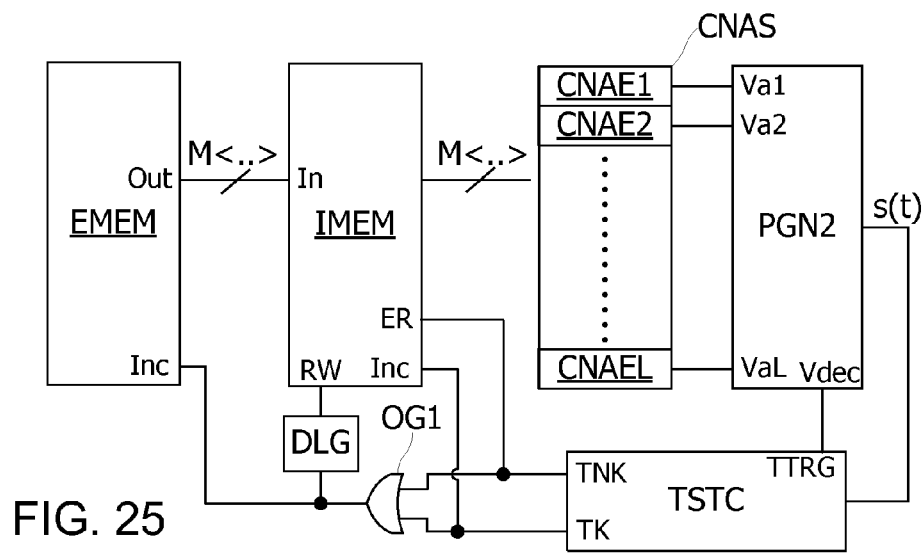
FIG. 25 shows a calibration circuit of the waveform generator, according to one embodiment.

FIG. 25 shows a calibration system comprising an external memory EMEM, an internal memory IMEM, a set CNAS of digital to analog converters CNA1, CNA2, ... CNAL, a waveform generator PGN2, a delay line DLG, a test calculator TSTC and a logic gate of OR type OG1. The generator PGN2 may be the generator PGN or PGN1 according to one of the embodiments previously described. In the case of the generator PGN1, the converters CNA1 ... CNAL are those of the generator. The memory EMEM comprises an output of read data connected to an input of data to be written in the memory IMEM. The memory IMEM comprises an output of read data connected to respective inputs of the converters CNA1 ... CNAL. Each converter CNA1 ... CNAL supplies an amplitude setpoint voltage to the generator PGN2. The generator PGN2 supplies a signal s(t) to the calculator TSTC.

The calculator TSTC supplies the trigger signal Vdec to the generator PGN2, and signals TNK, TK indicating if a test is positive or negative. The output TNK is connected to an input of the gate OG1 and an erase signal input ER of the memory IMEM. The output TK is connected to an input of the gate OG1 and a read or write address incrementation input of the memory IMEM. The output of the gate OG1 is connected to an input of the delay line DLG and a read address incrementation input of the memory EMEM. The memory EMEM memorizes all the possible values of sets of control words such as shown in FIG. 5 or 21, according to the embodiment of the generator PGN2.

According to a calibration procedure, the values of a first set of these control words at a first read address are transferred to the memory IMEM at a first address. The different values of the control words transferred to the memory IMEM are transmitted to the converters CNA1 . . . CNAL. The analog values produced by the converters are transmitted to the corresponding inputs of the generator PGN2. After the calculator TSTC triggering the generator PGN2 thanks to the signal Vdec, the signal s(t) coming from the generator PGN2 is transmitted to the calculator TSTC which analyzes the signal s(t). The calculator TSTC compares the features of the signal s(t) to an ideal signal by applying compliance criteria. These criteria may be of temporal or spectral order and correspond to the needs of an application (for example compliance of the spectrum of the signal s(t) in relation to a standard). If the signal s(t) does not comply with the criteria, the signal TNK is active, causing the erasure of the set of control words at the read address of the memory IMEM. If the signal s(t) complies with the criteria, the calculator TSTC activates the signal TK, causing the incrementation of the read address of the memory IMEM. The result is that the last set of control words transferred to the internal memory IMEM is kept. The activation of the signal TK or TNK triggers the incrementation of the read address of the memory EMEM to read a following set of control words and transfer it to the memory IMEM, either at the address of the previous set of control words, erased if the corresponding signal s(t) does not comply, or to a following address, and the putting the memory IMEM in write mode through the delay line DLG. At the end of the calibration procedure, the memory IMEM memorizes all the control words allowing a signal s(t) complying with the compliance criteria to be obtained. The values of a single set of control words may be retained at the end of the calibration procedure, by selecting the set of control words giving the best result, for example the one which makes it possible to obtain the most powerful signal. The memory IMEM may then be reduced to a single register able to memorize one or two sets of control words.

Figure 26:
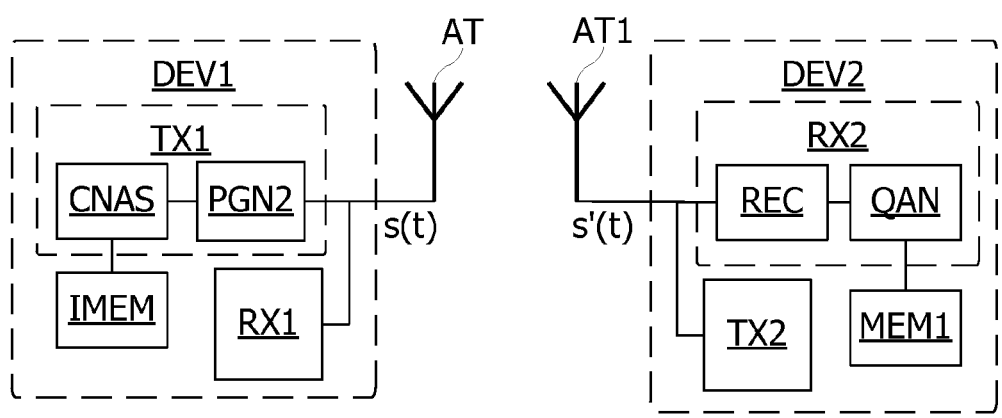
FIG. 26 shows a data transmission system implementing the waveform generator.

A dynamic calibration may also be performed for example as a part of a data transmission between a transmitter and a receiver, to guarantee a maximum quality of service QoS. Thus, FIG. 26 shows a data transmission system implementing the generator PGN2. The transmission system comprises two devices DEV1, DEV2, each comprising a data transmitter TX1, TX2 and a data receiver RX1, RX2 configured to receive data emitted by the transmitter TX1, TX2 of the other device. The transmitter TX1 and the receiver RX1 are connected to an antenna AT. Likewise, the transmitter TX2 and the receiver RX2 are connected to an antenna AT1. At least the transmitter TX1 comprises the generator PGN2 according to one of the embodiments previously described, connected to the antenna AT, and in the case of the generator PGN, the set of digital to analog converters CNAS connected between the memory IMEM and the generator PGN2. The converters CNAS receive sets of control words memorized in the memory IMEM, and supply analog control signals to the generator PGN2. At least the transmitter RX2 comprises reception circuits REC connected to a circuit for analyzing QAN the quality of service QoS of the signals received, the circuit QAN being connected to a memory MEM1.

During a calibration phase, the generator PGN2 and the memory IMEM are controlled to generate and transmit a first signal s(t) from a first set of control words read in the memory IMEM, the signal s(t) emitted being modulated by a test frame comprising for example the address of the set of control words read in the memory IMEM. The receiver RX2 receives a signal s'(t) corresponding to the signal s(t) emitted. The receiver RX2 measures the quality of the signal s'(t) and memorizes in the memory MEM1 the address of the set of control words transmitted in the signal s'(t) in association with the signal quality measured. The transmitter TX2 of the device DEV2 sends to the device DEV1 an acknowledgement message or waits for a following frame. After the reception of the acknowledgement message by the receiver RX1 of the device DEV1, or after the term of a time out of a certain duration corresponding to a processing and response time by the device DEV2, the transmitter TX1 accesses a following set of control words in the memory IMEM and the generator PGN2 controlled through the new set of control words selected, generates a new signal s(t) which is modulated by the test frame including the new read address of the memory IMEM. The receiver RX2 of the device DEV2 receives this signal, takes a new measure of the quality of the received signal and memorizes in the memory MEM1 the address transmitted and the quality measure obtained. Once all the sets of control words have been read in the memory IMEM and used to generate a test frame signal, the device DEV1 sends to the device DEV2 a calibration end signal. Upon receiving this calibration end signal, the device DEV2 searches in the memory MEM1, the address corresponding to the best quality measure and sends this address to the device DEV1 in response to the calibration end signal. The device DEV1 may then configure the transmitter TX1 so that it uses the set of control words located in the memory IMEM at the address transmitted by the device DEV2. If the quality of the transmission measured by the device DEV2 becomes insufficient, the device DEV2 may send to the device DEV1 a signal for triggering a new calibration.

Admittedly, the calibration procedure which has just been described between the transmitter TX1 and the receiver RX2 may also be performed between the transmitter TX2 and the receiver RX1.

It will be clear to those skilled in the art that the present disclosure is susceptible of various embodiments and applications. In particular, the disclosure is not limited to the use of a controlled oscillator. Other known means may be used to generate pulse streams.

The disclosure is not limited either to the use of an H bridge to combine the pulse signals and the amplitude setpoint signals of the pulses.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

CITATIONS OF THE PRIOR ART

[1] S. Bourdel, Y. Bachelet, J. Gaubert, R. Vauché, O. Fourquin, N. Dehaese, and H. Barthelemy; "A 9 pJ/Pulse 1.42 Vpp OOK CMOS UWB Pulse Generator for the 3.1-10.6 GHz FCC Band"; Microwave Theory and Techniques, IEEE Transaction on; January 2010

[2] Wentzloff, D. D.; Chandrakasan, A. P.; "A 47 pJ/pulse 3.1-to-5 GHz All-Digital UWB Transmitter in 90 nm CMOS"; Solid-State Circuits Conference, 2007. ISSCC 2007. Digest of Technical Papers. IEEE International; 11-15 Feb. 2007, Page(s) 118-591.

[3] Sanghoon Sim; Dong-Wook Kim; Songcheol Hong; "A CMOS UWB Pulse Generator for 6-10 GHz Applications"; Microwave and Wireless Components Letters, IEEE; Volume 19, Issue 2, February 2009, Page(s) 83-85.

[4] Bachelet, Y.; Bourdel, S.; Gaubert, J.; Bas, G.; Chalopin, H.; "Fully Integrated CMOS UWB Pulse Generator", Electronics Letters, Volume 42 Issue 22, Oct. 26, 2006, Page(s) 1277-1278.

[5] Jeongwoo Han; Cam Nguyen; "Ultra-wideband Electronically Tunable Pulse Generators"; Microwave and Wireless Components Letters, IEEE; Volume 14, Issue 3, March 2004, Page(s) 112-114.

[6] Tuan-Anh Phan; Jeongseon Lee; Krizhanovskii, V.; Seok-Kyun Han; Sang-Gug Lee; "A 18-pJ/Pulse OOK CMOS Transmitter for Multiband UWB Impulse Radio"; Microwave and Wireless Components Letters, IEEE; Volume 17, Issue 9, September 2007, Page(s) 688-690.

[7] Phan, A. T.; Lee, J.; Krizhanovskii, V.; Le, Q.; Han, S.-K.; Lee, S.-G.; "Energy-Efficient Low-Complexity CMOS Pulse Generator for Multiband UWB Impulse Radio"; Circuits and Systems I: Regular Papers, IEEE Transactions on; Volume 55, Issue 11, December 2008, Page(s) 3552-3563

[8] H. Kim, D. Park, and Y. Joo, "All-Digital Low-Power CMOS Pulse Generator for UWB system", Electronic Letters, vol. 40, no. 24, 25 Nov. 2004.

[9] Wentzloff, D. D.; Chandrakasan, A. P.; "A 47 pJ/pulse 3.1-to-5 GHz All Digital UWB Transmitter in 90 nm CMOS"; Solid-State Circuits Conference, 2007. ISSCC 2007. Digest of Technical Papers. IEEE International; 11-15 Feb. 2007 Page(s) 118-591.

[10] S. Bourdel, Y. Bachelet, J. Gaubert, M. Battista, M. Egels, N. Dehaese, "Low-Cost CMOS Pulse Generator for UWB Systems", Electronic Letters, vol. 43, issue 25, 6 Dec. 2007, pp. 1425-1427.

The invention claimed is:

1. A method for generating Ultra Wide Band (UWB) waveforms, comprising:
generating consecutive elementary pulses having respective durations corresponding respectively to respective setpoint durations, the elementary pulses having respective amplitudes that are substantially equal to one another,
amplifying separately and combining each elementary pulse as a function of a respective setpoint amplitude of a plurality of setpoint amplitudes in an H-bridge circuit comprising a first branch receiving a first pulse of the elementary pulses and the setpoint amplitude of the first puke, and a second branch receiving a second pulse of the elementary pulses, and the setpoint amplitude of the second pulse, the second pulse being consecutive to the first pulse, and
obtaining a waveform successively comprising each amplified elementary pulse, alternately positive and negative, provided by an output of the H-bridge circuit.

2. The method according to claim 1, wherein each elementary pulse is generated by combining by a logic operation a signal comprising an edge with this signal previously delayed by a duration corresponding to the setpoint duration of the elementary pulse.

3. The method according to claim 1, wherein each elementary pulse is generated by an oscillator supplying a signal having a period that is adjustable at a value corresponding to the setpoint duration of the elementary pulse.

4. The method according to claim 1, wherein one of the elementary pulses is introduced into one of the first and second branches of the H-bridge circuit through a gate comprising at least two transistors mounted in series in the one of the first and second branches.

5. The method according to claim 1, wherein the setpoint amplitude of one of the elementary pulses is introduced into a branch of the H-bridge circuit through a gate of at least two transistors mounted in series in the branch.

6. The method according to claim 1, wherein the H-bridge circuit includes a first group of branches each receiving a respective pulse of odd rank of the elementary pulses and the setpoint amplitude of the pulse of odd rank, and a second group of several branches each receiving a respective pulse of even rank of the elementary pulses and the setpoint amplitude of the pulse of even rank.

7. The method according to claim 1, comprising:
generating first and second pulse signals each comprising a stream of the elementary pulses, the elementary pulses alternately appearing in the first and second pulse signals,
generating a first amplitude signal having a plurality of amplitude setpoints respectively corresponding to the elementary pulses of the first pulse signal pulses,
generating a second amplitude signal having a plurality of amplitude setpoints respectively corresponding to the elementary pulses of the second pulse signal, and
obtaining the waveform by combining the pulse signals and the first and second amplitude signals, the waveform successively comprising each of the amplified, and alternately positive and negative, elementary pulses, each elementary pulse being amplified in accordance with the amplitude setpoint corresponding to the elementary pulse, supplied by one of the amplitude signals.

8. The method according to claim 1, comprising generating a positive waveform of positive polarity and generating a negative waveform of negative polarity, the negative waveform comprising a same number of elementary pulses as the positive waveform, each elementary pulse in one of the positive and negative waveforms having the same amplitude and a polarity opposite to an elementary pulse of same rank in the other of the positive and negative waveforms.

9. The method according to claim 8, wherein the H-bridge circuit includes an odd branch, and an even branch, the positive waveform being generated by introducing pulses of odd rank into the odd branch of the H-bridge circuit, and pulses of even rank into the even branch of the H-bridge circuit, the negative waveform being generated by introducing the pulses of odd rank into the even branch of the H-bridge circuit, and the pulses of even rank into the odd branch of the H-bridge circuit.

10. A method for transmitting binary data, comprising:
generating a positive waveform of positive polarity and a negative waveform of negative polarity, depending on a value equal to 0 or 1 of a transmitted data, and emitting the generated waveforms, the negative waveform comprising a same number of elementary pulses as the positive waveform, each elementary pulse in one of the positive and negative waveforms having the same amplitude and a polarity opposite to an elementary pulse of same rank in the other of the positive and negative waveforms, the generating comprising:

generating consecutive elementary pulses having respective durations corresponding respectively to respective setpoint durations, the elementary pulses having respective amplitudes that are substantially equal to one another, amplifying each elementary pulse separately as a function of a respective setpoint amplitude of a plurality of setpoint amplitudes, and obtaining a combined waveform successively comprising each of the amplified, alternately positive and negative, elementary pulses, the obtaining including combining the amplified elementary pulses.

11. The method according to claim 10, wherein the elementary pulses are amplified and combined in a H-bridge circuit comprising an odd branch, and an even branch, the positive waveform being generated by introducing pulses of odd rank into the odd branch of the H-bridge circuit, and pulses of even rank into the even branch of the H-bridge circuit, the negative waveform being generated by introducing the pulses of odd rank into the even branch of the H-bridge circuit, and the pulses of even rank into the odd branch of the H-bridge circuit.

12. The method according to claim 11, comprising:
a calibration phase including:
generating a plurality of calibration waveforms that differ from each other in amplitudes and/or durations of elementary pulses thereof, the calibration waveforms being identified by respective waveform identifiers,
emitting respective calibration messages comprising the waveform identifiers, respectively, using the calibration waveforms, and
receiving the calibration messages and determining respective transmission quality measures from the calibration messages received, and
selecting a preferred calibration waveform among the calibration waveforms, as a function of the transmission quality measures obtained.

13. An Ultra Wide Band (UWB) waveform generator comprising:
an elementary pulse generator configured to supply elementary pulses having respective durations corresponding respectively to respective setpoint durations, the elementary pulses having respective amplitudes that are substantially equal to one another, and
an adder configured to separately amplify the elementary pulses as a function of a respective setpoint amplitude of a plurality of setpoint amplitudes and combine the amplified elementary pulses so as to obtain a waveform successively comprising each of the amplified, alternately positive and negative, elementary pulses, the adder comprising an H-bridge comprising at least a first branch configured to receive a first pulse and the setpoint amplitude of the first pulse, and at least a second branch configured to receive a second pulse, consecutive to the first pulse, and the setpoint amplitude of the second pulse.

14. The generator according to claim 13, wherein the elementary pulse generator comprises a circuit that includes a delay cell and a logic circuit configured to combine a binary signal having an edge in input of the delay cell with a signal in output of the delay cell, the delay cell being configured to apply to the signal edge in input a delay defined by the setpoint duration of one of the elementary pulses.

15. The generator according to claim 13, comprising an oscillator configured to produce an output signal having a frequency controlled as a function of the setpoint duration, and defining the durations of the elementary pulses.

16. The generator according to claim 13, wherein the H-bridge includes a first group of several branches each receiving a pulse of odd rank of the waveform to be generated and the setpoint amplitude of the pulse of odd rank, and a second group of several branches each receiving a pulse of even rank and the setpoint amplitude of the pulse of even rank.

17. The generator according to claim 13, wherein each branch of the adder comprises at least two transistors mounted in series in the branch and having a gate configured to receive an elementary pulse to be amplified and combined.

18. The generator according to claim 13, wherein each branch of the adder comprises at least two transistors mounted in series in the branch and having a gate configured to receive the setpoint amplitude of an elementary pulse.

19. A transmitter comprising:
an elementary pulse generator configured to supply elementary pulses having respective durations corresponding respectively to respective setpoint durations, the elementary pulses having respective amplitudes that are substantially equal to one another,
an adder configured to separately amplify the elementary pulses as a function of a respective setpoint amplitude of a plurality of setpoint amplitudes and combine the amplified elementary pulses so as to obtain a waveform successively comprising each of the amplified, alternately positive and negative, elementary pulses, and
a transmitting antenna linked to the adder, the adder comprising an H-bridge comprising at least a first branch configured to receive a first pulse and the setpoint amplitude of the first pulse, and at least a second branch configured to receive a second pulse, consecutive to the first pulse, and the setpoint amplitude of the second pulse.

* * * * *